(12) United States Patent
Choi et al.

(10) Patent No.: US 11,008,905 B2
(45) Date of Patent: May 18, 2021

(54) VARIABLE VALVE APPARATUS

(71) Applicants: HYUNDAI MOTOR COMPANY, Seoul (KR); KIA MOTORS CORPORATION, Seoul (KR); You-Seok Back, Suwon-si (KR)

(72) Inventors: Myung Sik Choi, Seoul (KR); You-Seok Back, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 16/684,068

(22) Filed: Nov. 14, 2019

(65) Prior Publication Data

US 2021/0010397 A1 Jan. 14, 2021

(30) Foreign Application Priority Data

Jul. 12, 2019 (KR) .................. 10-2019-0084225

(51) Int. Cl.
*F01L 1/34* (2006.01)
*F01L 13/00* (2006.01)
*F01L 1/047* (2006.01)
*F01L 1/18* (2006.01)
*F02D 13/06* (2006.01)
*F02D 13/02* (2006.01)

(52) U.S. Cl.
CPC .......... *F01L 13/0005* (2013.01); *F01L 1/047* (2013.01); *F01L 1/185* (2013.01); *F01L 13/0021* (2013.01); *F02D 13/0269* (2013.01); *F02D 13/06* (2013.01); *F01L 2013/001* (2013.01); *F02D 2200/101* (2013.01); *F02D 2200/1002* (2013.01)

(58) Field of Classification Search
CPC ..... F01L 13/0042; F01L 7/02; F01L 2305/00; F01L 2001/467; F01L 2001/186; F01L 1/185; F01L 2013/103; F01L 2013/10; F01L 13/0005; F02D 13/0226

See application file for complete search history.

(56) References Cited

U.S. PATENT DOCUMENTS 5,653,198 A * 8/1997 Diggs ................. F01L 1/185
123/90.16
6,532,920 B1 * 3/2003 Sweetnam .......... F01L 13/0015
123/90.16

FOREIGN PATENT DOCUMENTS

KR 10-2012-0003528 A 1/2012

* cited by examiner

*Primary Examiner* — Zelalem Eshete
(74) *Attorney, Agent, or Firm* — Brinks Gilson & Lione

(57) ABSTRACT

A variable valve apparatus includes: a swing body mounted to rotate to open and close a valve; an inner body driven by a cam and mounted in the swing body so as to switch a relatively-rotatable state and a latched state with respect to the swing body; a latching pin slidably mounted in the swing body so as to switch the latched state and the relatively-rotatable state of the inner body with respect to the swing body; and a control mechanism pressing the latching pin to make the inner body be latched to the swing body.

18 Claims, 23 Drawing Sheets

FIG. 18

|  |  | CDA | | BASE | |
|---|---|---|---|---|---|
|  |  | Cyl 2, 3 | Cyl 1, 4 | Cyl 2, 3 | Cyl 1, 4 |
| INTAKE | CONTROL MECHANISM | FIRST MOTOR | BASE | FIRST MOTOR | BASE |
|  |  | TWO-STAGE VARIATION |  | TWO-STAGE VARIATION |  |
|  | ZERO | O |  |  |  |
|  | BASE |  |  | O | O |
| EXHAUST | CONTROL MECHANISM | SECOND MOTOR | BASE | SECOND MOTOR | BASE |
|  |  | TWO-STAGE VARIATION |  | TWO-STAGE VARIATION |  |
|  | ZERO | O |  |  |  |
|  | BASE |  | O | O | O |

FIG. 22

| | mode | CDA with atkinson | | CDA with base | | atkinson | | atkinson + base | | base | |
|---|---|---|---|---|---|---|---|---|---|---|---|
| | cylinder group | Cyl 2, 3 | Cyl 1, 4 | Cyl 2, 3 | Cyl 1, 4 | Cyl 2, 3 | Cyl 1, 4 | Cyl 2, 3 | Cyl 1, 4 | Cyl 2, 3 | Cyl 1, 4 |
| intake cam | control mechanism | first motor / three-stage variation | second motor / two-stage variation | first motor / three-stage variation | second motor / two-stage variation | first motor / three-stage variation | second motor / two-stage variation | first motor / three-stage variation | second motor / two-stage variation | first motor / three-stage variation | second motor / two-stage variation |
| | zero cam profile | O | | O | | | | | | | |
| | base cam profile | | | | O | | | | O | O | O |
| | atkinson (long duration) | | O | | | O | O | O | | | |
| exhaust cam | control mechanism | third motor / two-stage variation | no motor / no variation | third motor / two-stage variation | no motor / no variation | third motor / two-stage variation | no motor / no variation | third motor / two-stage variation | no motor / no variation | third motor / two-stage variation | no motor / no variation |
| | zero cam profile | O | | O | | | | | | | |
| | base cam profile | | O | | O | O | O | O | O | O | O |

VARIABLE VALVE APPARATUS

CROSS REFERENCE TO RELATED APPLICATION

This application claims priority to and the benefit of Korean Patent Application No. 10-2019-0084225, filed on Jul. 12, 2019, the entire contents of which are incorporated herein by reference.

FIELD

The present disclosure relates to a variable valve apparatus which enables to vary opening and closing of a valve of an engine.

BACKGROUND

The statements in this section merely provide background information related to the present disclosure and may not constitute prior art.

Since an engine generates power by sucking air and fuel into a combustion chamber and combusting the air and the fuel, performance of the engine may be substantially affected by how to control an intake valve and an exhaust valve to control an amount of air flowing into the combustion chamber and discharge of exhaust gas, respectively.

Technologies have been developed to vary behaviors of valves such as the intake valve and the exhaust valve during operation of the engine. Among these technologies, a technology changing a cam profile of a cam can control an opening time and an amount of lift of a valve And thus, by changing between a cam profile which implements a general valve behavior and a cam profile which may implement the Miller cycle is possible, the operation of the engine may be changed from a general engine operation into a Miller cycle operation. In addition, a cylinder deactivation (CDA) function of deactivating a combustion function in some cylinders of the engine under a low-load condition may also be implemented.

The contents described as the related art have been provided only to assist in understanding the background of the present disclosure and should not be considered as corresponding to the related art known to those having ordinary skill in the art.

SUMMARY

The present disclosure provides a variable valve apparatus capable of easily changing a cam profile for opening and closing a valve, with a simple configuration, and implementing a cylinder deactivation (CDA) function to reduce fuel consumption of an engine and improve marketability.

According to an embodiment of the present disclosure, a variable valve apparatus includes: a swing body mounted to rotate to open and close a valve; an inner body driven by a cam and mounted in the swing body so as to switch between a relatively-rotatable state and a latched state with respect to the swing body; a latching pin slidably mounted in the swing body so as to switch between the latched state and the relatively-rotatable state of the inner body with respect to the swing body; and a control mechanism pressing the latching pin to make the inner body be latched to the swing body.

A lower portion of a first side of the swing body may be spherically supported by a supporting member, and a lower portion of a second side of the swing body may be in contact with a stem end of the valve, such that the swing body rotates with respect to the supporting member to open and close the valve.

The inner body may be mounted rotatably with respect to the swing body around a rotation axis parallel to a rotation axis of the swing body, and an inner roller may be rotatably mounted while keeping a state of being in contact with the cam to receive movement of the cam.

An inner spring may be mounted between the inner body and the swing body to elastically support the inner roller of the inner body toward the cam, and a swing roller may be mounted in the swing body so as to be rotatable around a rotation axis parallel to a rotation axis of the inner roller.

The latching pin is inserted into an inner groove portion to constrain rotation of the inner body with respect to the swing body, and the inner groove portion may be formed in the inner body. In particular, the latching pin slidably penetrates a swing hole formed in the swing body, and a latching spring elastically supports the latching pin in a direction away from the inner groove portion so that the latching pin protrudes outward from the swing body. In one form, the latching spring may be provided between the latching pin and the swing body.

A plurality of inner bodies may be coaxially arranged in a row in the swing body, and a plurality of latching pins may be mounted in the swing body so as to switch latched states of the inner bodies with respect to the swing body, respectively.

The control mechanism may include: first and second control shafts coaxially arranged to each other; and a plurality of control levers mounted on at least one of the first control shaft or the second control shaft, so that a rotational force of at least one of the first or second control shafts is converted into an elastic force applying to end portions of the plurality of latching pins protruding outward from the swing body.

The cam may include a first cam and a second cam which are mounted on the same cam shaft and have cam profiles different from each other, first inner bodies among the inner bodies are installed to be each driven by the first cam, a second inner body among the inner bodies is mounted to be driven by the second cam, and the latching pins include first latching pins mounted to make the first inner bodies be latched to the swing body, and a second latching pin mounted to make the second inner body be latched to the swing body.

The second inner body may be mounted at the center of the swing body, the first inner bodies may be mounted at opposite sides of the second inner body, respectively, and inner rollers of the first inner bodies may each have a width smaller than a width of an inner roller of the second inner body.

The first control shaft may be a hollow shaft, and the second control shaft is inserted into the hollow shaft as a coaxial shaft. In one form, the plurality of control levers may include: a first control lever connected to the first control shaft and configured to transfer an elastic force to the first latching pin; and a second control lever connected to the second control shaft and configured to transfer an elastic force to the second latching pin. In another form, a cut portion may be formed in the first control shaft and configured to allow a rotational force of the second control shaft to be transferred to the second control lever positioned outside the first control shaft.

The variable valve apparatus may further include: a first connecting pin configured to limit a rotation range of the first control lever and fixed to the first control shaft; a first control spring mounted between the first connecting pin and the first control lever; a second connecting pin fixed to the second control shaft while penetrating through the cut portion so as to limit a rotation range of the second control lever; and a second control spring mounted between the second connecting pin and the second control lever. In particular, the first control lever is rotatably mounted on an outer circumferential surface of the first control shaft, and the second control lever is rotatably mounted on the outer circumferential surface of the hollow shaft in a rotatable state with respect to the second control shaft.

The first control lever may have an elastically-deformable plate shape, and may be fixed to an outer circumferential surface of the hollow shaft by a first fixing pin, and the second control lever may have an elastically-deformable plate shape and may be fixed to the second control shaft by a second fixing pin through the cut portion at the outside of the first control shaft.

According to another embodiment of the present disclosure, a variable valve engine includes: single variable valve apparatuses each including one inner body and mounted, respectively, at intake sides and exhaust sides of combustion chambers which correspond to the half of entire combustion chambers of the engine and have unconsecutive combustion sequences; a first control shaft mounted to switch a state of pressing latching pins of the single variable valve apparatuses mounted at the intake sides, respectively; a first motor mounted to drive the first control shaft; a second control shaft mounted to switch a state of pressing latching pins of the single variable valve apparatuses mounted at the exhaust sides; and a second motor mounted to drive the second control shaft.

An inner roller mounted in the inner body of each of the single variable valve apparatuses may be mounted so as to keep a state of being in contact with a cam having a base cam profile, and a swing roller mounted in a swing body of each of the single variable valve apparatuses may be mounted so as to keep a state of being in contact with a cam which implements a zero lift.

According to another embodiment of the present disclosure, a variable valve engines includes: multi variable valve apparatuses each including a plurality of inner bodies and mounted, respectively, at intake sides of combustion chambers which correspond to the half of entire combustion chambers of the engine and have unconsecutive combustion sequences; single variable valve apparatuses each including one inner body and mounted, respectively, at exhaust sides of the combustion chambers where the multi variable valve apparatuses are mounted, and intake sides of the remaining combustion chambers; a first control shaft mounted to switch a state of pressing first latching pins of the multi variable valve apparatuses mounted at the intake sides, respectively; a first motor mounted to drive the first control shaft; a second control shaft mounted to switch a state of pressing latching pins of the single variable valve apparatuses mounted at the intake sides, respectively, and second latching pins of the multi variable valve apparatuses; a second motor mounted to drive the second control shaft; a third control shaft mounted to switch a state of pressing latching pins of the single variable valve apparatuses mounted at the exhaust sides, respectively; and a third motor mounted to drive the third control shaft.

An inner roller mounted in a first inner body of each of the multi variable valve apparatuses may be mounted so as to keep a state of being in contact with a cam having a base cam profile; an inner roller mounted in a second inner body of each of the multi variable valve apparatuses may be mounted so as to keep a state of being in contact with a cam having an Atkinson cam profile; a swing roller mounted in a swing body of each of the multi variable valve apparatuses may be mounted so as to keep a state of being in contact with a cam which implements a zero lift; an inner roller mounted in the inner body of each of the single variable valve apparatuses mounted at the intake sides of the combustion chambers may be mounted so as to keep a state of being in contact with a cam having the Atkinson cam profile; a swing roller mounted in a swing body of each of the single variable valve apparatuses mounted at the intake sides of the combustion chambers may be mounted so as to keep a state of being in contact with a cam having the base cam profile; an inner roller mounted in the inner body of each of the single variable valve apparatuses mounted at the exhaust sides of the combustion chambers may be mounted so as to keep a state of being in contact with a cam having the base cam profile; and a swing roller mounted in a swing body of each of the single variable valve apparatuses mounted at the exhaust sides of the combustion chambers may be mounted so as to keep a state of being in contact with a cam which implements the zero lift.

The first control shaft and the second control shaft may be disposed adjacent to the intake sides of the combustion chambers in parallel while being spaced apart from each other, and the first motor and the second motor may be mounted opposite to each other with the first control shaft and the second control shaft interposed therebetween.

The first control shaft and the second control shaft may be coaxially disposed adjacent to the intake sides of the combustion chambers, and the first motor and the second motor may be mounted opposite to each other with the first control shaft and the second control shaft interposed therebetween.

The first control shaft and the second control shaft may be coaxially disposed adjacent to the intake sides of the combustion chambers, and the first motor and the second motor may be mounted at one sides of the first control shaft and the second control shaft, respectively.

According to another embodiment of the present disclosure, a method for controlling the variable valve engine described above, the method includes: partitioning an engine operation region according to engine revolutions per minute (RPM) and a desired engine torque and classifying the engine operation region into a CDA with Atkinson operation region, a CDA with base operation region, an Atkinson operation region, a base with Atkinson operation region, and a base operation region in ascending order of magnitude of a load to the engine in a specific engine RPM range; controlling all of the multi variable valve apparatuses at the intake sides of the combustion chambers and the single variable valve apparatuses at the exhaust sides of the combustion chambers to implement the zero lift, and controlling the single variable valve apparatuses at the intake sides of the combustion chambers to be driven according to the Atkinson cam profile in the CDA with Atkinson operation region; controlling all of the multi variable valve apparatuses at the intake sides of the combustion chambers and the single variable valve apparatuses at the exhaust sides of the combustion chambers to implement the zero lift, and controlling the single variable valve apparatuses at the intake sides of the combustion chambers to be driven according to the base cam profile in the CDA with base operation region; controlling all of the multi variable valve apparatuses at the intake sides of the combustion chambers and the single variable valve apparatuses at the intake sides of the combustion chambers to be driven according to the Atkinson cam profile, and controlling the single variable valve apparatuses at the exhaust sides of the combustion chambers to be driven according to the base cam profile in the Atkinson operation region; controlling all of the multi variable valve apparatuses at the intake sides of the combustion chambers to be driven according to the Atkinson cam profile, and controlling the single variable valve apparatuses at the intake sides of the combustion chambers and the single variable valve apparatuses at the exhaust sides of the combustion chambers to be driven according to the base cam profile in the base with Atkinson operation region; and controlling all of the multi variable valve apparatuses and the single variable valve apparatuses to be driven according to the base cam profile in the base operation region.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 18 is a table illustrating operation modes in which the engine of FIG. 17 is operated;

FIG. 22 is a table illustrating operation modes in which the engines of FIGS. 19 to 21 are operated.

Figure 1:
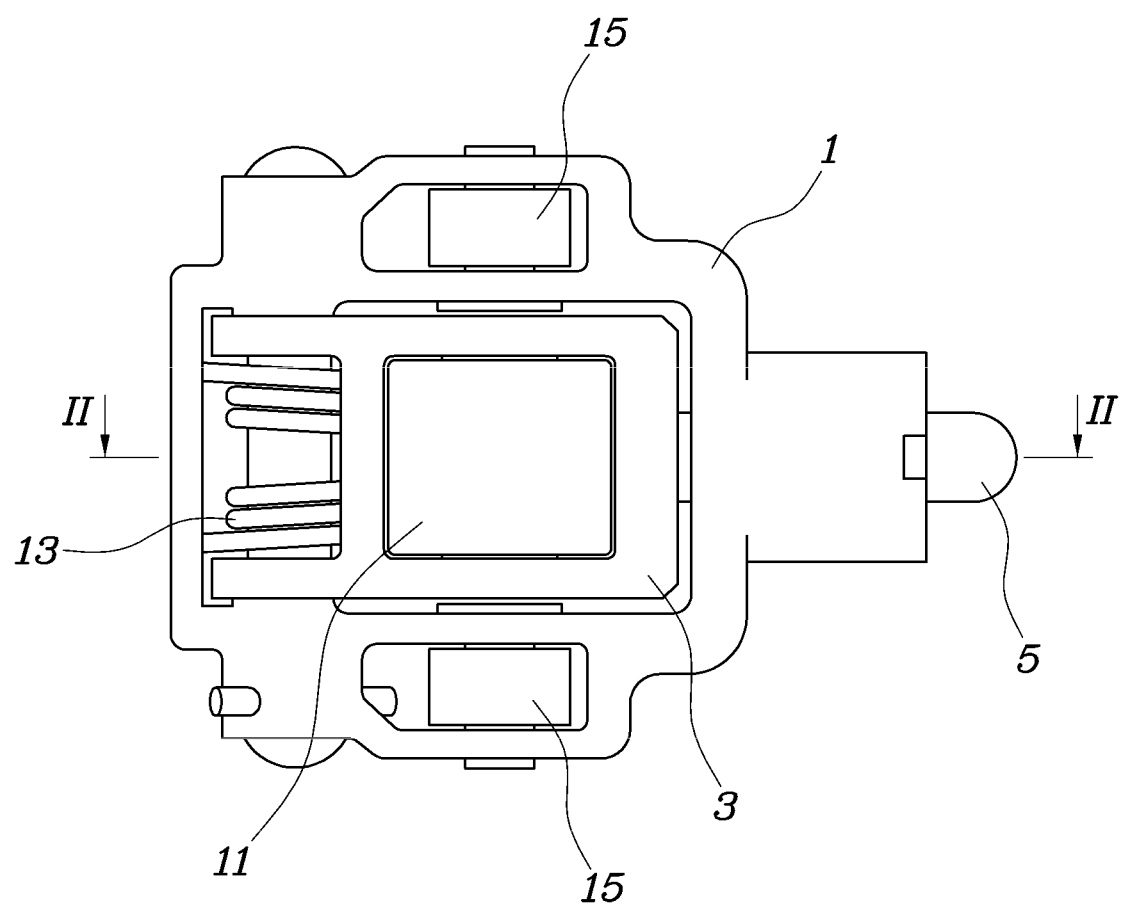
FIG. 1 is a configuration view of a variable valve apparatus according to a first embodiment of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
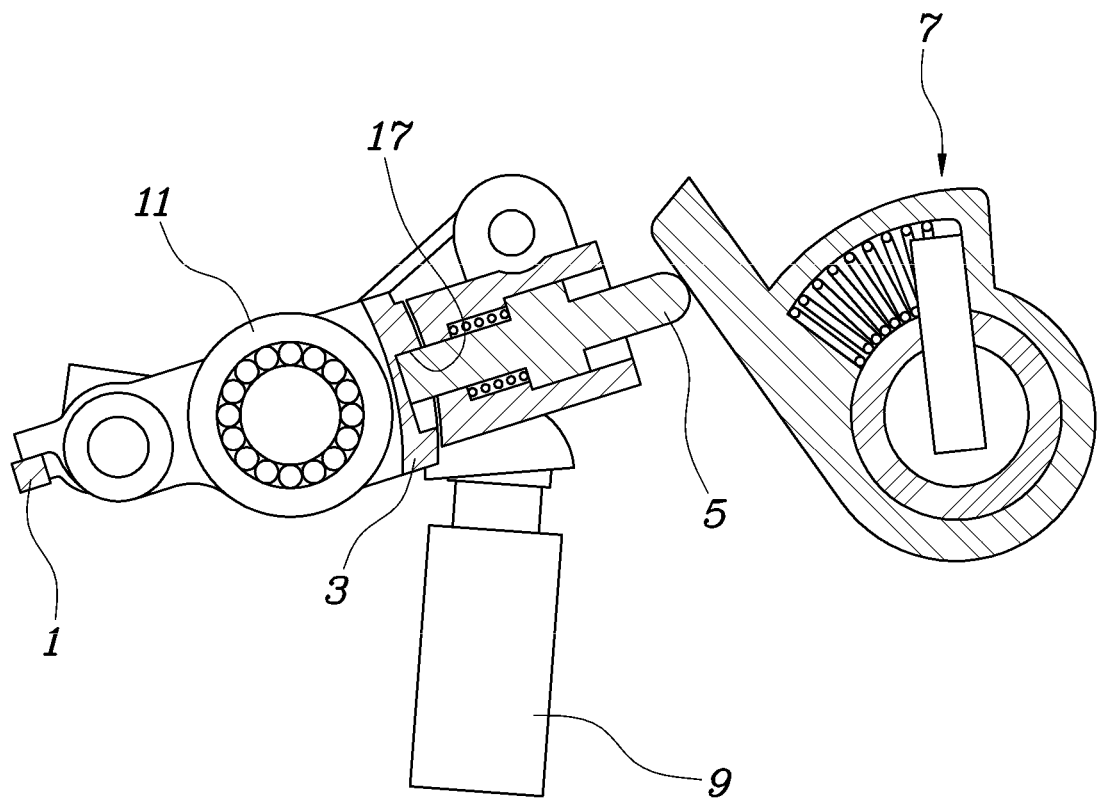
FIG. 2 is a cross-sectional view taken along line II-II of FIG. 1.
Figure 3:
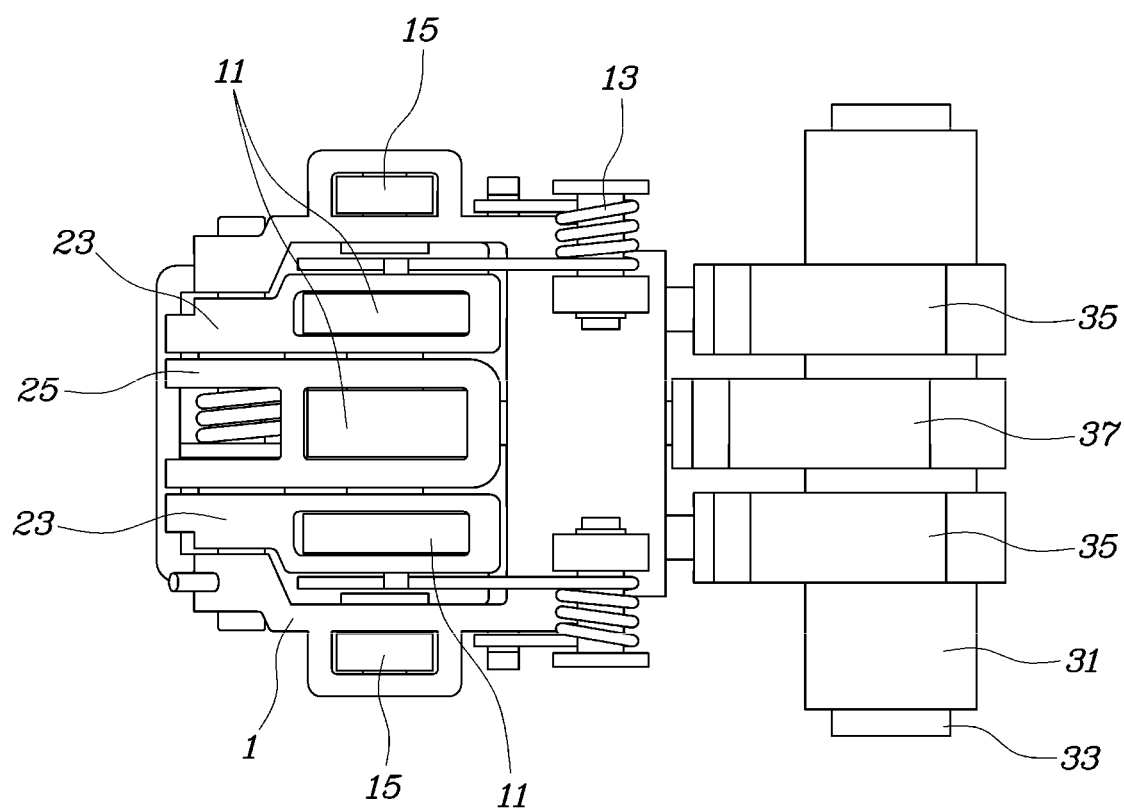
FIG. 3 is a configuration view of a variable valve apparatus according to a second embodiment of the present disclosure.
Figure 4:
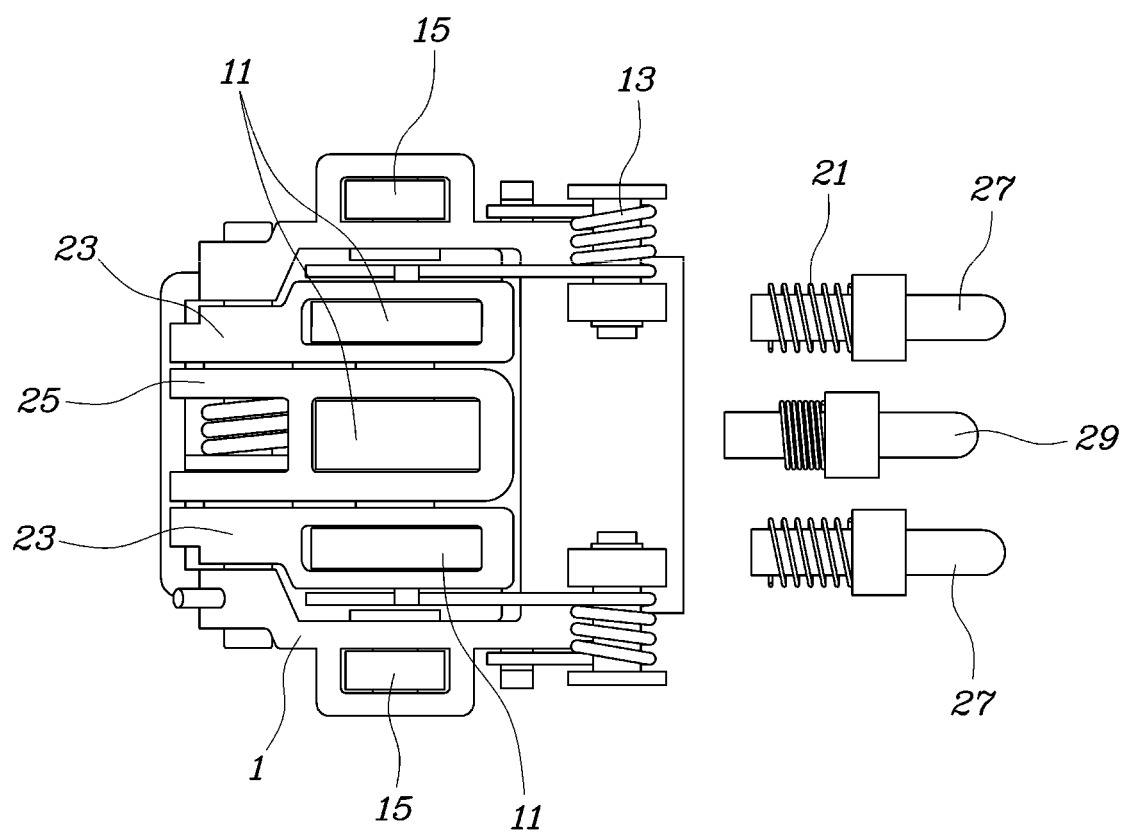
FIG. 4 is a view illustrating a configuration of a swing body portion of FIG. 3.
Figure 5:
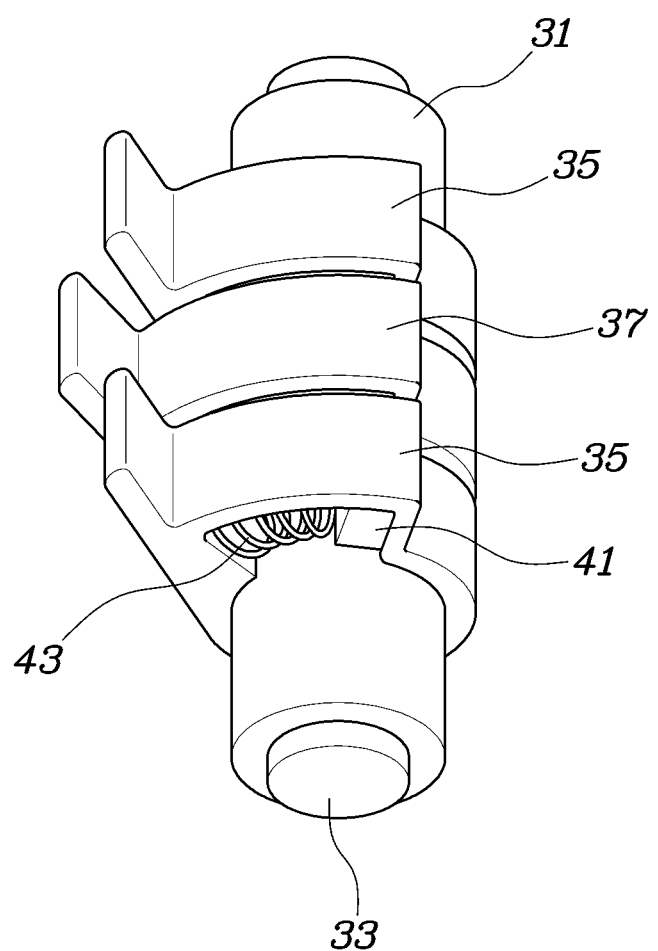
FIG. 5 is a view illustrating a configuration of a control mechanism portion of FIG. 3.
Figure 6:
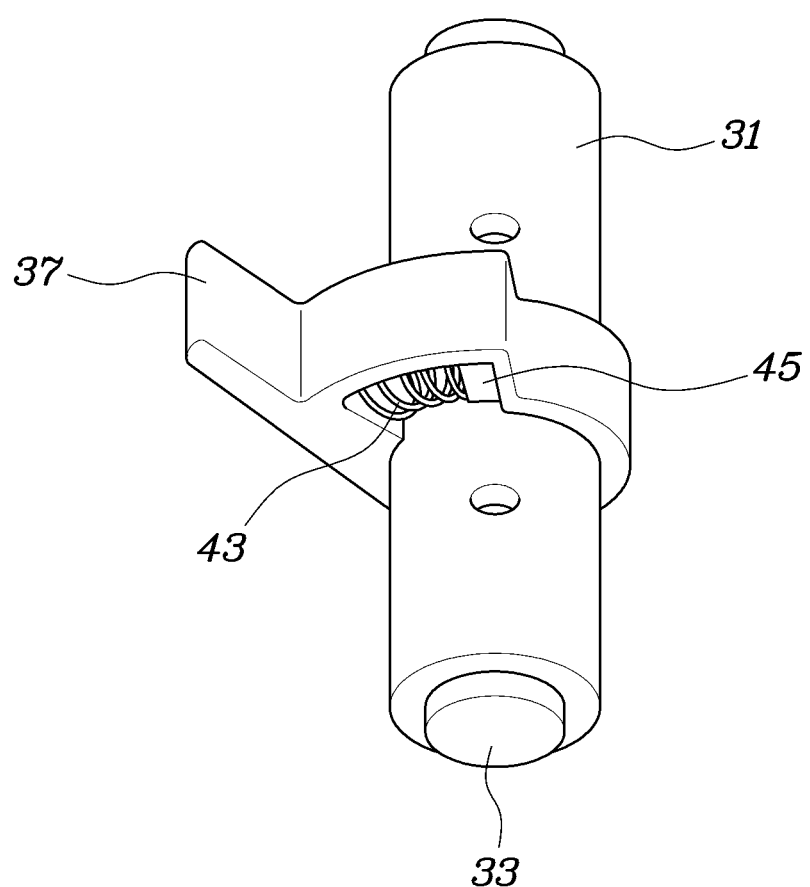
FIG. 6 is a view for describing a structure in which a second control lever is mounted on a control shaft.

Referring to FIGS. 1 and 2, a variable valve apparatus according to the present disclosure may include a swing body 1 mounted to rotate to open and close a valve; an inner body 3 driven by a cam and mounted in the swing body 1 so as to switch a relatively-rotatable state and a latched state with respect to the swing body 1; a latching pin 5 slidably mounted in the swing body 1 so as to switch the latched state and the relatively-rotatable state of the inner body 3 with respect to the swing body 1; and a control mechanism 7 pressing the latching pin 5 to make the inner body 3 be latched to the swing body 1.

For reference, the control mechanism is not illustrated in FIG. 1 illustrating the variable valve apparatus according to the first embodiment, and a cross-section of the control mechanism illustrated in FIG. 2 has the same technical concept as that according to a second embodiment illustrated in FIGS. 3 to 12.

A lower portion of one side of the swing body 1 may be spherically supported by a supporting member 9, and a lower portion of the other side of the swing body 1 may be in contact with a stem end of the valve, such that the swing body 1 rotates with respect to the supporting member 9, thereby opening and closing the valve.

That is, the stem end of the valve is in contact with the lower portion of the left side of the swing body to be slid downward by the rotation of the swing body 1, thereby opening the valve. Detailed illustration thereof is omitted.

It goes without saying that the supporting member 9 may also function as a hydraulic lash adjuster (HLA) as used in a valve opening and closing apparatus according to the related art.

Figure 7:
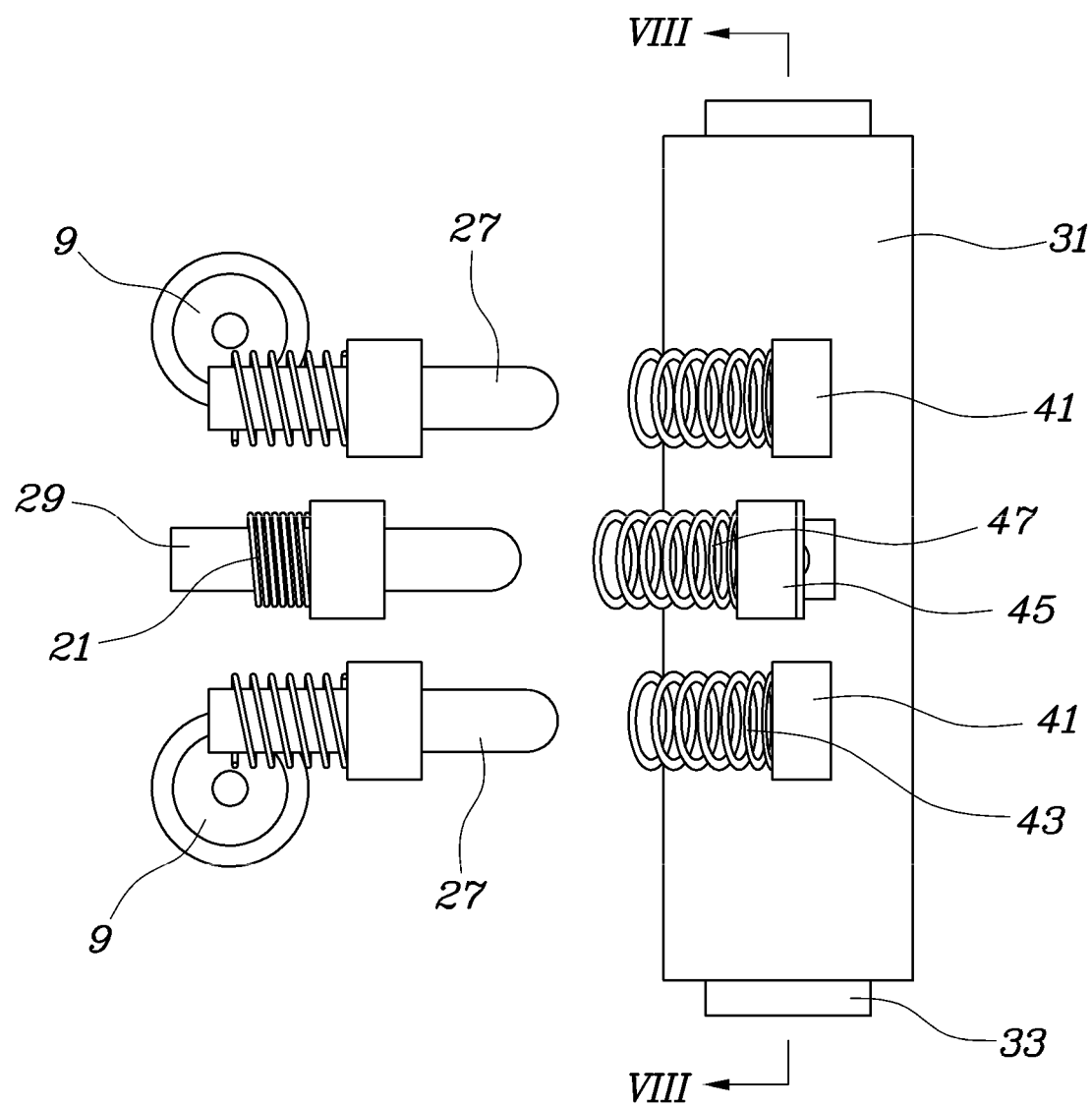
FIG. 7 is a view describing the control shaft, a first connecting pin, and a second connecting pin.
Figure 8:
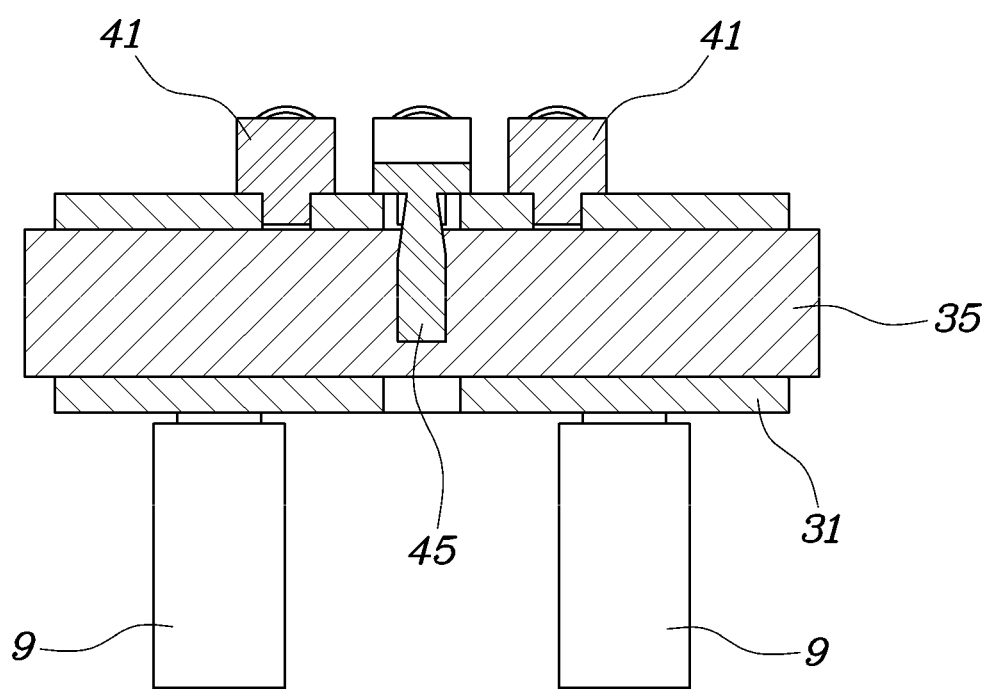
FIG. 8 is a cross-sectional view taken along line VIII-VIII of FIG. 7.
Figure 9:
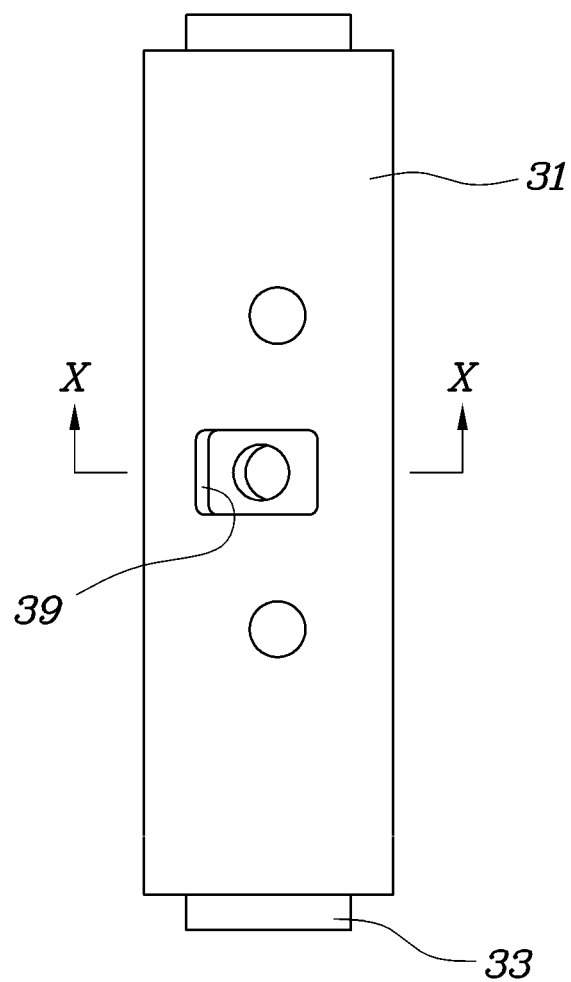
FIG. 9 is a view illustrating the control shaft.
Figure 10:
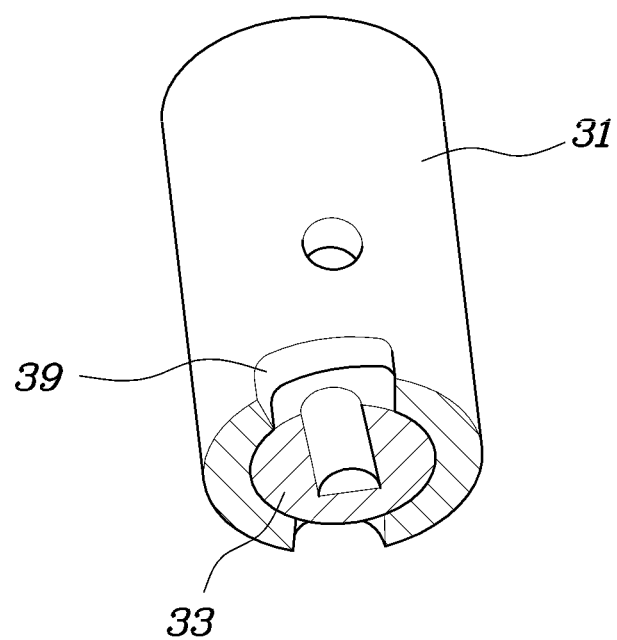
FIG. 10 is a cross-sectional perspective view taken along line X-X of FIG. 9.

For reference, a top view of the supporting member 9 is also illustrated on the left side of FIG. 7.

The inner body 3 is mounted rotatably with respect to the swing body 1 around a rotation axis parallel to a rotation axis of the swing body 1, and an inner roller 11 is rotatably mounted while keeping a state of being in contact with the cam to receive movement of the cam.

An inner spring 13 is mounted between the inner body 3 and the swing body 1 to elastically support the inner roller 11 of the inner body 3 toward the cam, and a swing roller 15 is mounted in the swing body 1 so as to be rotatable around a rotation axis parallel to that of the inner roller 11.

An inner groove portion 17, into which the latching pin 5 is inserted to constrain the rotation of the inner body 3 with respect to the swing body 1, is formed in the inner body 3, a swing hole 19, through which the latching pin 5 slidably penetrates, is provided in the swing body 1, and a latching spring 21, which elastically supports the latching pin 5 in a direction away from the inner groove portion 17 so that the latching pin 5 protrudes outward from the swing body 1, is provided between the latching pin 5 and the swing body 1.

That is, in the variable valve apparatus according to the present disclosure, once the control mechanism 7 presses the latching pin 5, the latching pin 5 slides in the swing body 1 to be inserted into the inner groove portion 17 of the inner body 3, such that the inner body 3 is integrated with the swing body 1, and in this state, displacement according to a profile of the cam, which is transferred to the inner roller 11 of the inner body 3, is transferred to the swing body 1 through the inner roller 11, such that the swing body 1 rotates to open and close the valve.

Naturally, once the control mechanism 7 releases the latching pin 5, the latching pin 5 partially protrudes outward from the swing body 1 by the latching spring 21 to escape from the inner groove portion 17, such that the inner body 3 is in the relatively-rotatable state with respect to the swing body 1, thereby, from this point on, preventing the displacement of the inner body 3 driven by the cam from being transferred to the swing body 1.

FIGS. 3 to 12 illustrate a variable valve apparatus according to the second embodiment of the present disclosure having the same basic mechanism as that according to the first embodiment. However, in the variable valve apparatus according to the second embodiment, a plurality of inner bodies are provided in one swing body 1, such that the swing body 1 may be driven according to various cam profiles depending on which inner body the swing body 1 is integrated with by a latching pin.

That is, according to the present embodiment, the plurality of inner bodies are coaxially arranged in a row in the swing body 1, and a plurality of latching pins are mounted in the swing body 1 so as to enable a switching of latched states of the inner bodies with respect to the swing body 1, respectively.

The control mechanism 7 may include a plurality of coaxially mounted control shafts, and a plurality of control levers mounted on the control shafts, respectively, so that a rotational force of the control shafts may be transferred as an elastic force to end portions of the latching pins protruding outward from the swing body 1.

Figure 19:
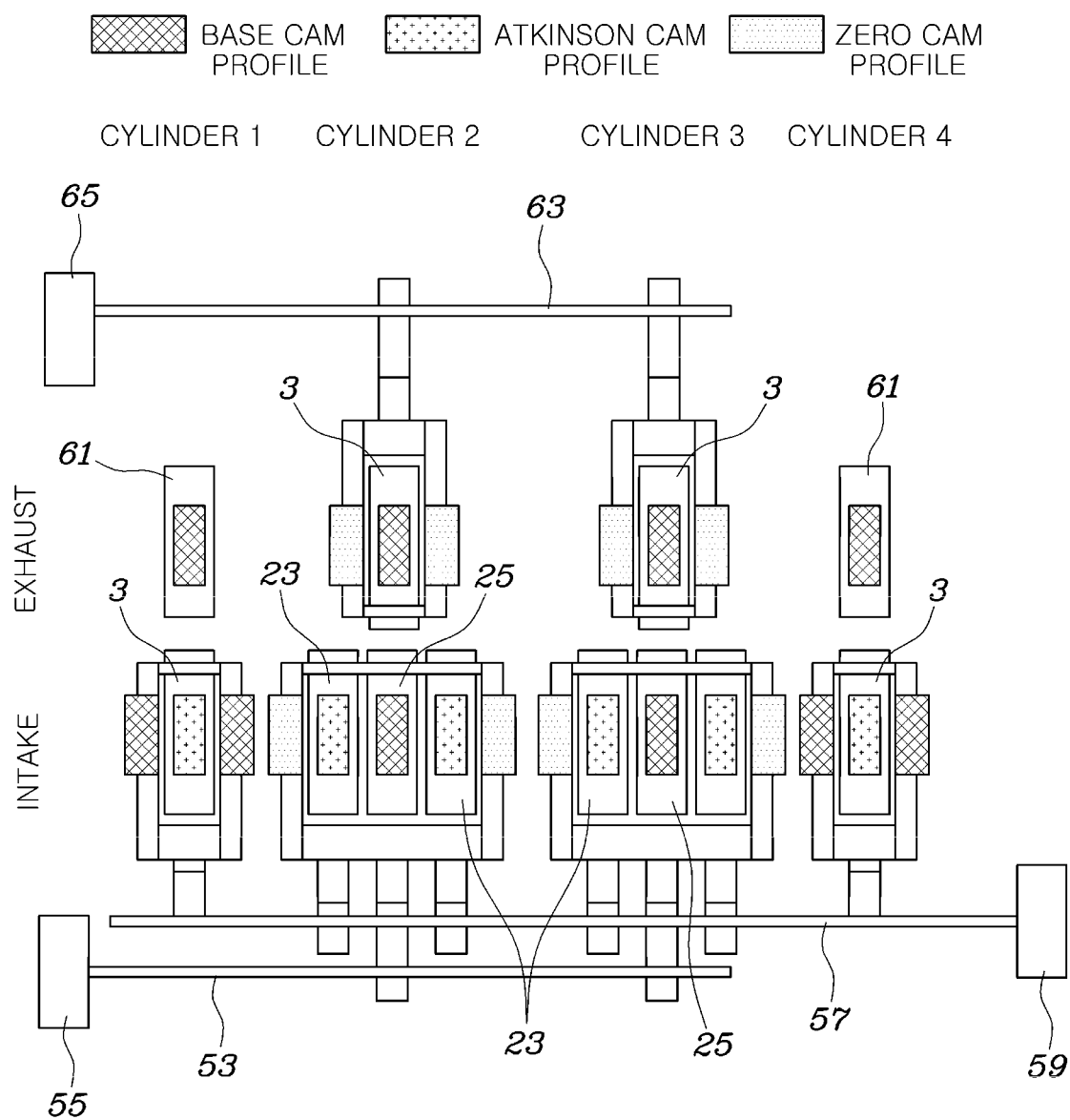
FIG. 19 is a diagram describing a variable valve engine according to a second embodiment of the present disclosure.

Alternatively, the control shafts may also be spaced apart from each other in parallel as illustrated in FIG. 19, rather than being coaxially arranged as described above.

The cam may include a first cam and a second cam which are mounted on the same cam shaft and have cam profiles different from each other, first inner bodies 23 among the inner bodies may be mounted to be each driven by the first cam, a second inner body 25 among the inner bodies may be mounted to be driven by the second cam, and the latching pins may include first latching pins 27 mounted to make the first inner bodies 23 be latched to the swing body 1, and a second latching pin 29 mounted to make the second inner body 25 be latched to the swing body 1.

It goes without saying that cams having various cam profiles may further be added. According to the present embodiment, however, two cam profiles are implemented by the first cam and the second cam, respectively. For example, the variable valve apparatus used in engines of FIGS. 19 to 21 has a configuration in which the second inner body 25 is mounted at the center of the swing body 1, and the first inner bodies 23 are mounted at opposite sides of the second inner body 25, respectively, such that the second cam having a cam profile which implements a base lift is in contact with the inner roller 11 of the second inner body 25, and the first cam having a cam profile which implements the Atkinson cycle is in contact with the inner roller 11 of the first inner body 23.

Here, the cam profile (hereinafter, referred to as a base cam profile) which implements the base lift is almost the same as a cam profile according to the related art for opening and closing a valve at the time of operation of a general engine, is basically used in an engine to which the present disclosure is applied, and is used in the widest engine operation area. Meanwhile, the cam profile (hereinafter, referred to as an Atkinson cam profile) which implements the Atkinson cycle means a cam profile by which an opening period of an intake valve becomes longer in comparison to the base cam profile to implement the Atkinson cycle.

Figure 11:
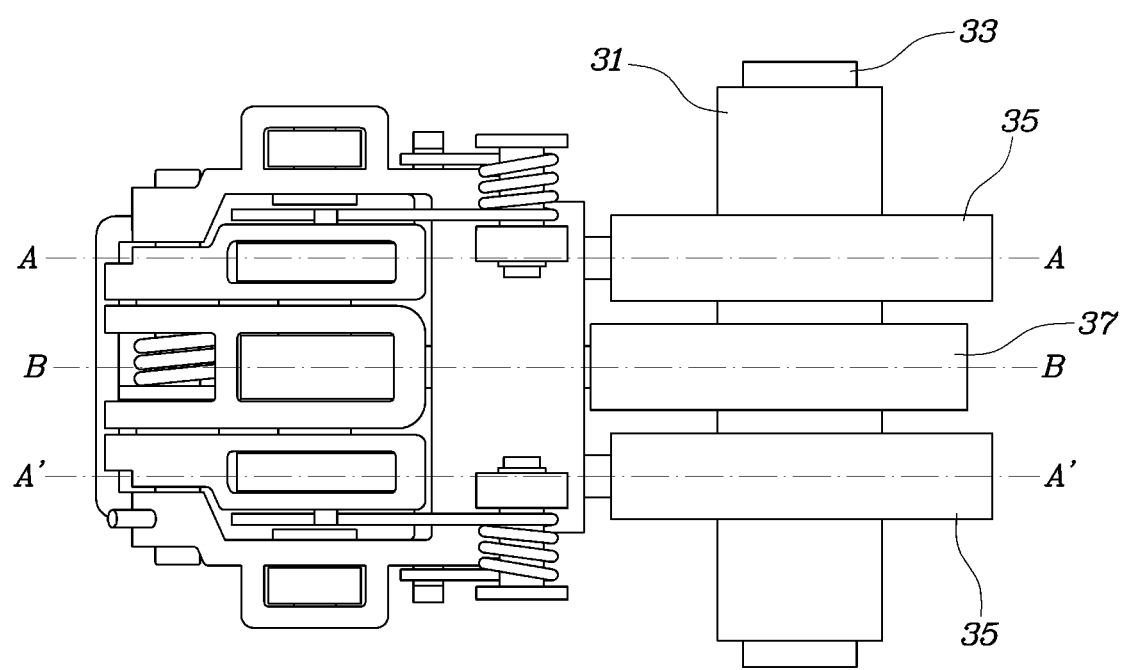
FIG. 11 is a view describing a state in which a first inner body is not latched to the swing body by a first latching pin, and a second inner body is latched to the swing body by a second latching pin.

Meanwhile, the inner rollers 11 of the first inner bodies 23 each have a width smaller than that of the inner roller 11 of the second inner body 25 as illustrated in FIG. 11 and are provided at opposite sides of the second inner body 25, respectively, in order to improve followability of the inner roller 11 of the first inner body 23 to the first cam, and durably secure the opening and closing operation of the valve.

Figure 23:
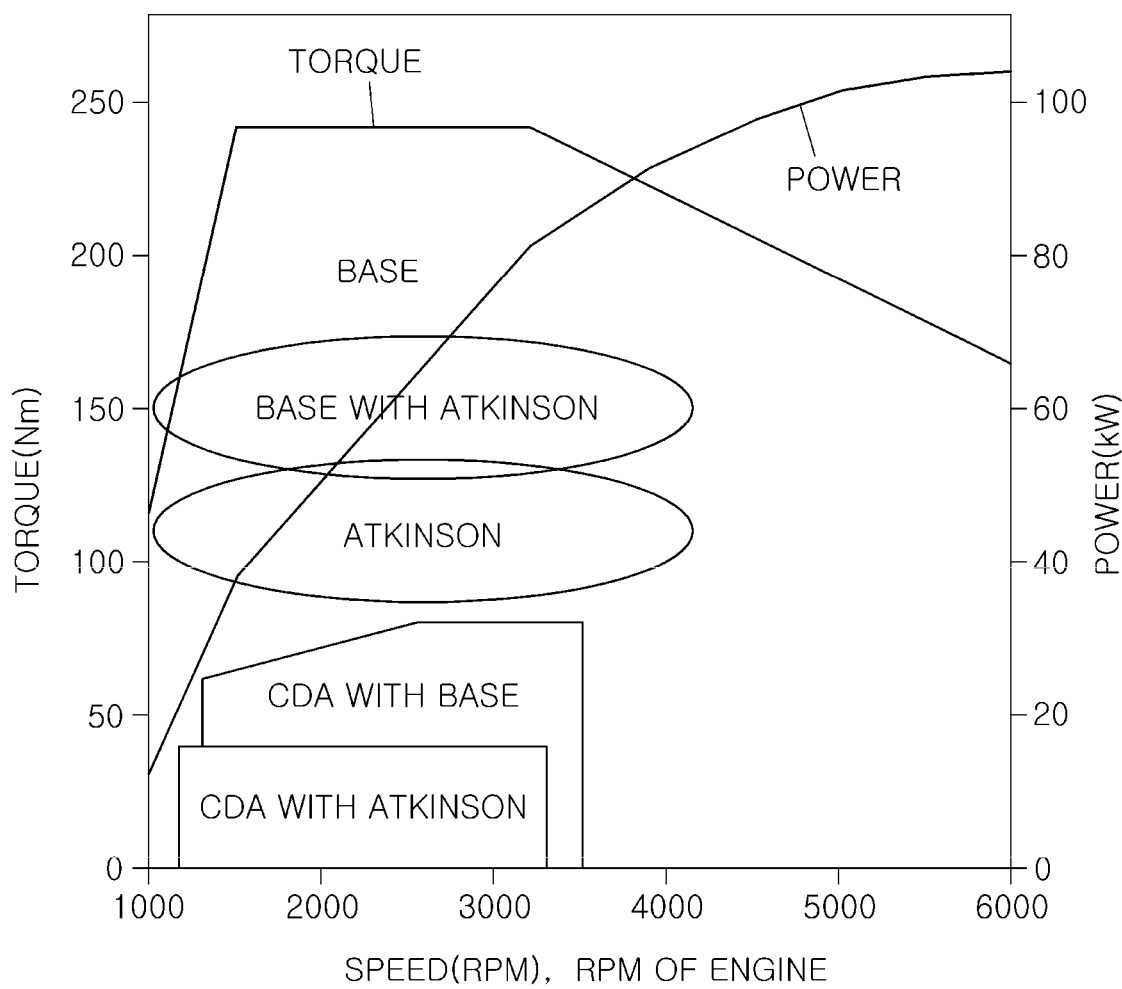
FIG. 23 is a graph for describing engine operation regions used in a method for controlling a variable valve engine according to the present disclosure.

Specifically, in controlling a variable valve engine according to the present disclosure as illustrated in FIG. 23, in order to operate the engine with the base cam profile, the second inner body 25 is driven by the second cam to operate the swing body 1 in a region where a desired engine torque is high, and a region where revolutions per minute (RPM) of the engine is high, which correspond to a high-load condition. Particularly, in a region in which the engine RPM is very high, although the inner roller 11 of the first inner body 23 does not transfer, to the swing body 1, a change according to the profile of the first cam, the inner roller 11 of the first inner body 23 needs to have stable followability to the change according to the profile of the first cam while being in close contact with the first cam, and thus it is advantageous to decrease an inertia force of the first inner body 23 and the inner roller 11 themselves in terms of securing such a followability.

Further, the inner roller 11 of the first inner body 23 needs to have a sufficient hardness to receive the displacement according to the cam profile of the first cam in a situation in which the swing body 1 is driven by the first cam, and in a case where the first inner body 23 is mounted at only one side of the second inner body 25, opening and closing of two valves, which are opened and closed by the swing body 1, may not be simultaneously performed due to deformation, in which, for example, the swing body 1 is inclined to one side, caused by repetitive operation. Therefore, in the present embodiment, the first inner bodies 23 are provided at opposite ends of the second inner body 25.

According to the present embodiment, the control shafts include a hollow shaft 31, and an inserted shaft 33 inserted into the hollow shaft as a coaxial shaft, and the control levers include first control levers 35 connected to the hollow shaft 31 and each transferring an elastic force to the first latching pin 27, and a second control lever 37 connected to the inserted shaft 33 and transferring an elastic force to the second latching pin 29.

The hollow shaft 31 has a cut portion 39 which allows a rotational force of the inserted shaft 33 to be transferred to the second control lever 37 positioned outside the hollow shaft 31.

The first control lever 35 is rotatably mounted on an outer circumferential surface of the hollow shaft 31, a first connecting pin 41, which may limit a rotation range of the first control lever 35, is fixed to the hollow shaft 31, and a first control spring 43 is mounted between the first connecting pin 41 and the first control lever 35. The second control lever 37 is rotatably mounted on the outer circumferential surface of the hollow shaft 31 in a rotatable state with respect to the inserted shaft 33, a second connecting pin 45 is fixed to the inserted shaft 33 while penetrating through the cut portion 39 so as to be able to limit a rotation range of the second control lever 37, and a second control spring 47 is mounted between the second connecting pin 45 and the second control lever 37.

As a result, the hollow shaft 31 and the inserted shaft 33 may make the first control lever 35 and the second control lever 37 press the first latching pin 27 and the second latching pin 29, respectively, while being driven separately from each other.

Here, the first control spring 43 functions to elastically support the first control lever 35 and press the first latching pin 27 with the elastic force when the hollow shaft 31 rotates. For example, in a state in which the first control spring 43 presses the first latching pin 27 to make the first latching pin 27 be inserted into the inner groove portion 17 of the first inner body 23 as described above, but the inner groove portion 17 is not aligned and thus the first latching pin 27 may not be immediately inserted, the first control spring 43 keeps a compressed state, and makes the first latching pin 27 slide to be inserted into the inner groove portion 17 once the inner groove portion 17 is aligned. The second control spring 47 also functions in the same way.

Figure 12:
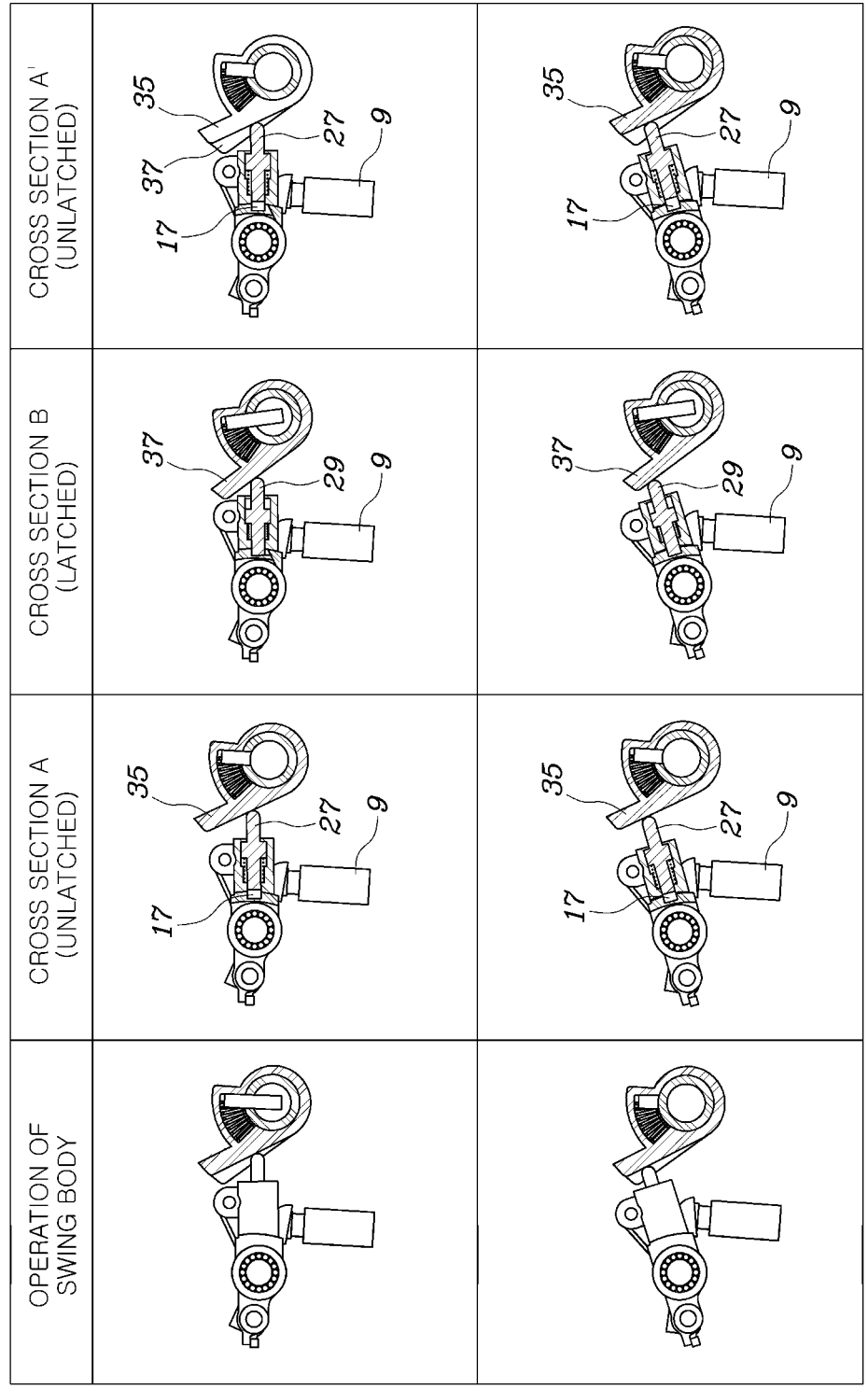
FIG. 12 is a table showing states of cross sections taken along lines of FIG. 11 when the swing body is driven by a second cam.
Figure 13:
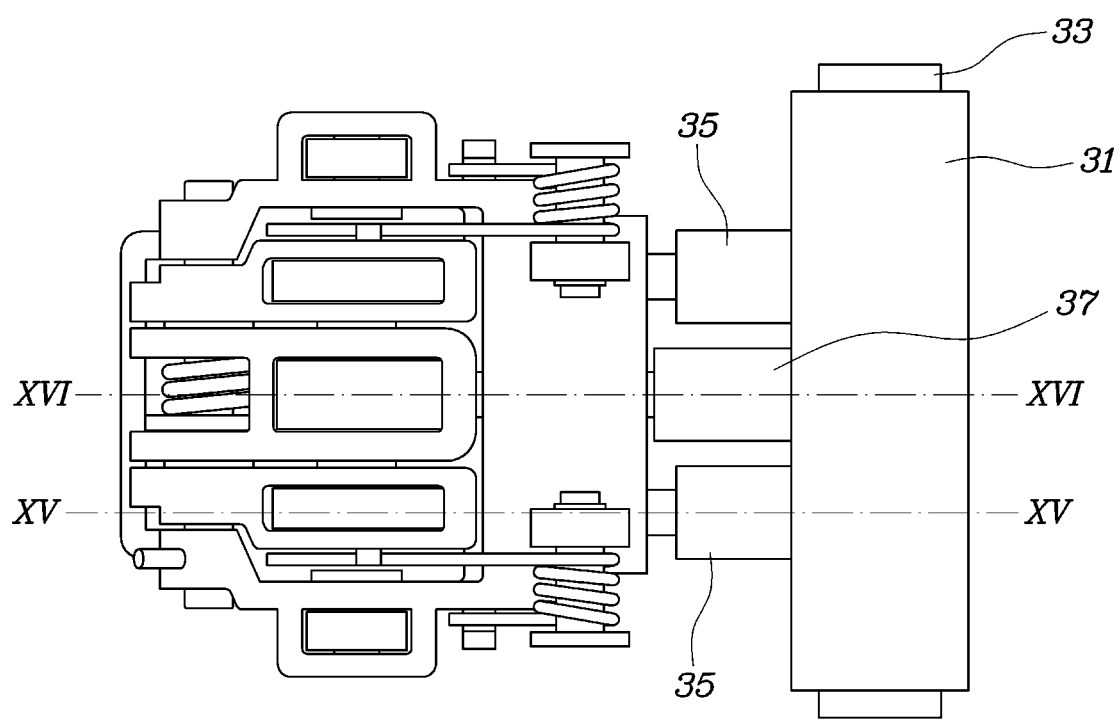
FIG. 13 is a configuration view of a variable valve apparatus according to a third embodiment of the present disclosure.
Figure 14:
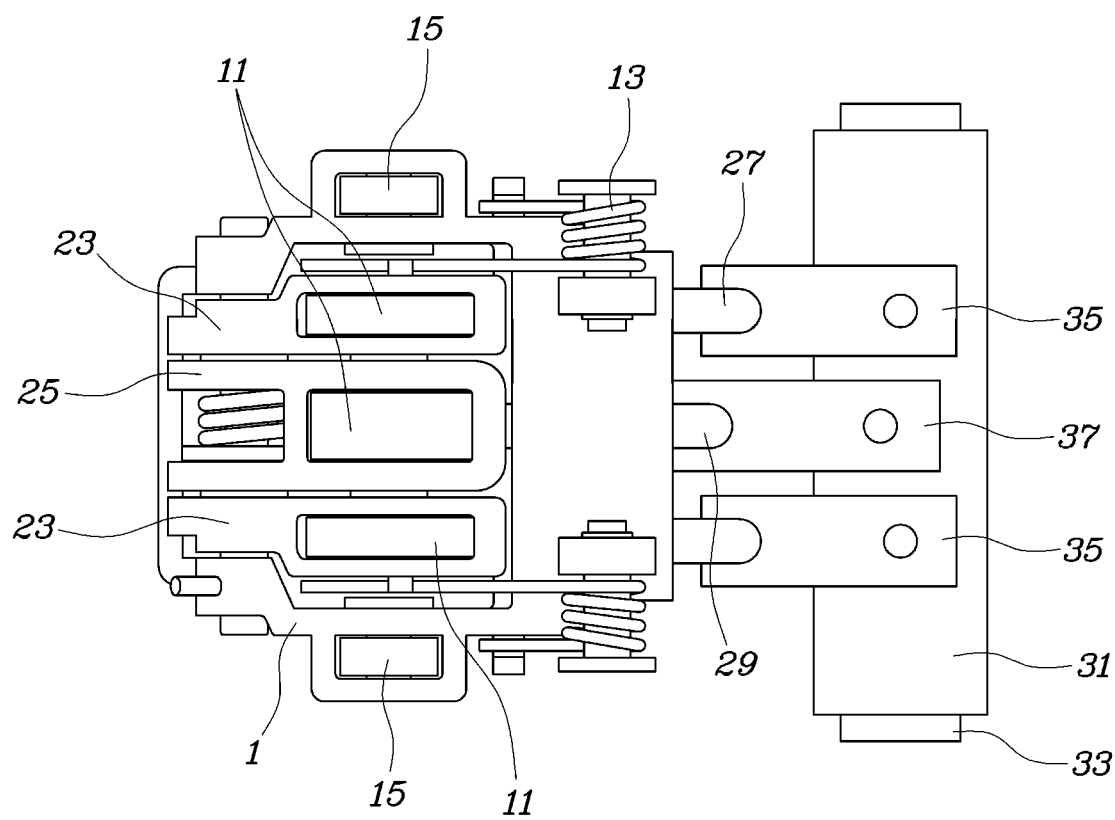
FIG. 14 is a view illustrating a lower side of the variable valve of FIG. 13.
Figure 15:
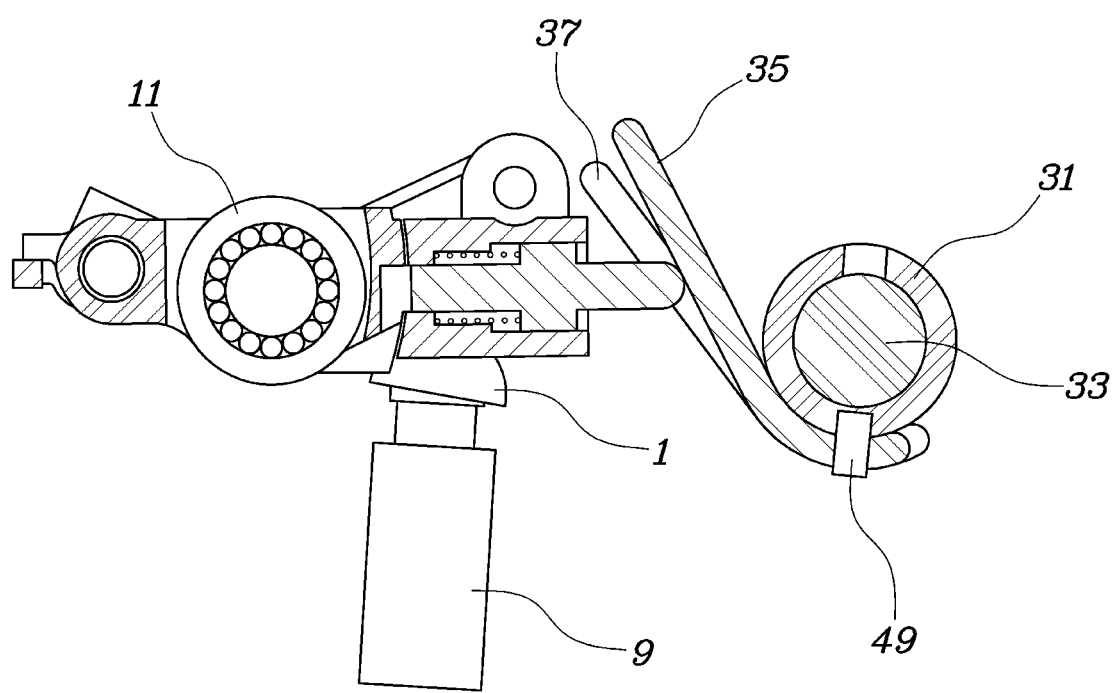
FIG. 15 is a cross-sectional view taken along line XV-XV of FIG. 13.
Figure 16:
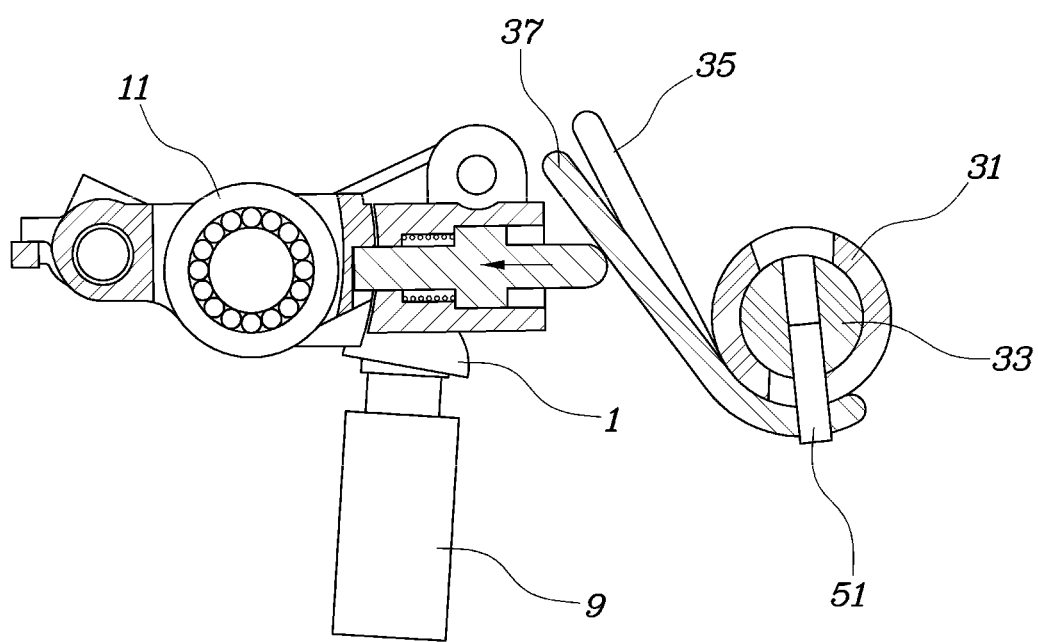
FIG. 16 is a cross-sectional view taken along line XVI-XVI of FIG. 13.

For reference, cross sections in a state in which the inner roller 11 of the second inner body 25 is not pressed by the second cam (not illustrated) are illustrated on the upper side of FIG. 12, and cross sections in a state in which the inner roller 11 of the second inner body 25 is pressed by the second cam, such that the swing body 1 rotates to open the valve are illustrated on the lower side of FIG. 12.

FIGS. 13 to 16 illustrate a variable valve apparatus according to a third embodiment of the present disclosure, in which a configuration of the swing body 1 is the same as that according to the second embodiment, and only a configuration of the control mechanism 7 is different from that according to the second embodiment.

According to the present embodiment, the first control lever 35 has an elastically-deformable plate shape, and is fixed to an outer circumferential surface of the hollow shaft 31 by a first fixing pin 49, and the second control lever 37 has an elastically-deformable plate shape and is fixed to the inserted shaft 33 by a second fixing pin 51 through the cut portion 39 at the outside of the hollow shaft 31.

That is, unlike the second embodiment, the first control lever 35 and the second control lever 37 may be elastically deformed to provide an elastic force to the first latching pin 27 and the second latching pin 29, respectively. Therefore, here, the first control spring 43 and the second control spring 47 are not required, such that it is possible to reduce the number of components and improve assemblability, which is advantageous.

Figure 17:
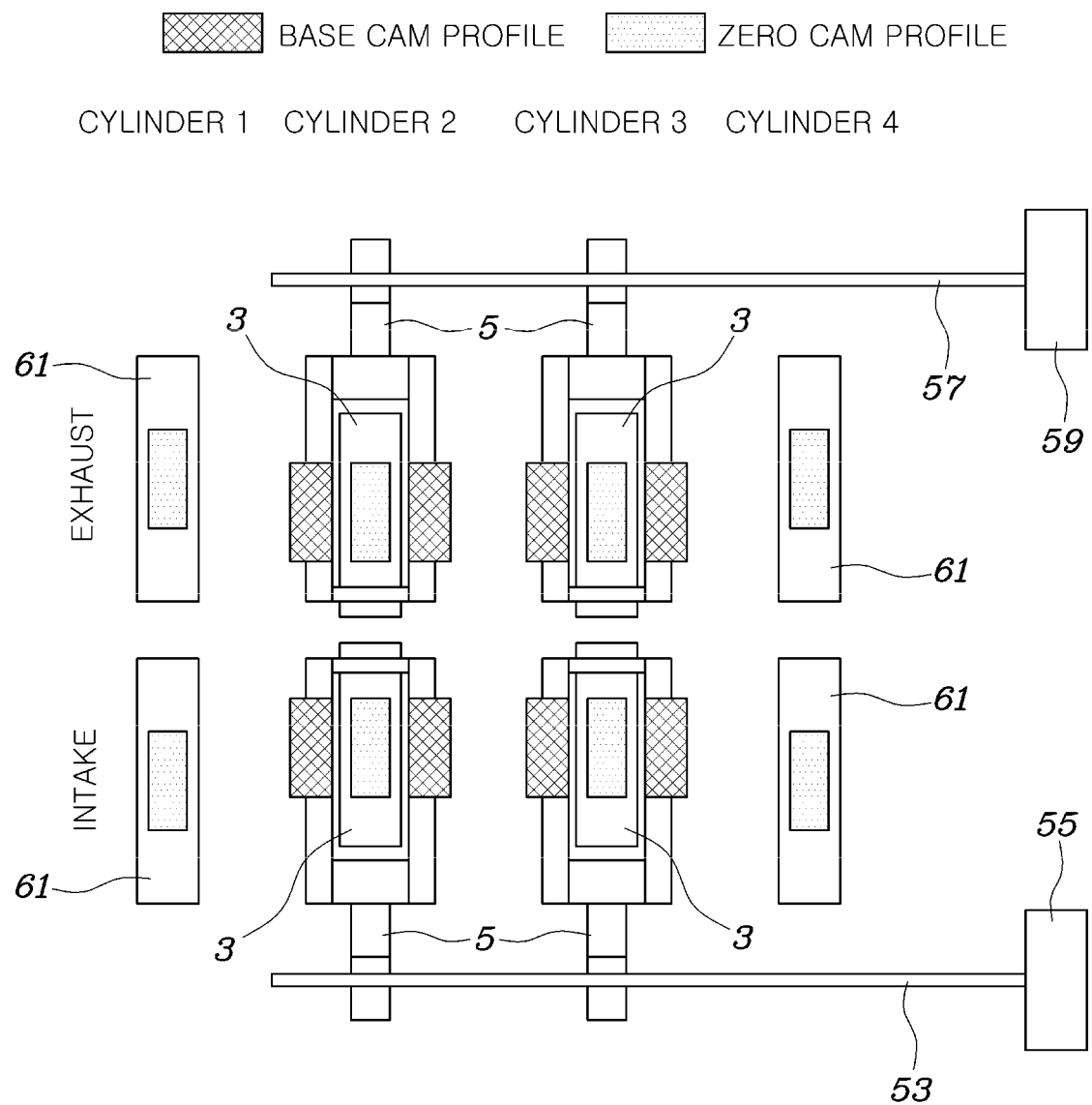
FIG. 17 is a diagram for describing a variable valve engine according to a first embodiment of the present disclosure.

FIG. 17 is a view for describing a configuration of a variable valve engine according to the present disclosure using the variable valve apparatus described above, and conceptually illustrates an arrangement relation of valve opening and closing mechanisms when viewed from the top of the engine.

For reference, the cam shaft is not illustrated, and instead, types of cam profiles of cams on the cam shaft are individually indicated at positions of corresponding inner rollers 11 and swing rollers 15, respectively. Hereinafter, a single variable valve apparatus means a variable valve apparatus having only one inner body like the variable valve apparatus according to the first embodiment illustrated in FIGS. 1 and 2, and a multi variable valve apparatus means a variable valve apparatus having a plurality of inner bodies like the variable valve apparatuses according to the second embodiment and the third embodiment illustrated in FIGS. 3 to 16.

A variable valve engine according to a first embodiment of the present disclosure illustrated in FIG. 17 may include single variable valve apparatuses each including one inner body and mounted, respectively, at intake sides and exhaust sides of combustion chambers which correspond to the half of entire combustion chambers of the engine and have an unconsecutive combustion sequence; a first control shaft 53 mounted to switch a state of pressing latching pins of the single variable valve apparatuses mounted at the intake sides, respectively; a first motor 55 mounted to drive the first control shaft 53; a second control shaft 57 mounted to switch a state of pressing latching pins of the single variable valve apparatuses mounted at the exhaust sides; and a second motor 59 mounted to drive the second control shaft 57.

That is, the single variable valve apparatuses are mounted at intake sides and exhaust sides of Cylinder numbers 2 and 3.

The inner roller 11 mounted in the inner body 3 of each of the single variable valve apparatuses is mounted so as to keep a state of being in contact with a cam having the base cam profile, and the swing roller 15 mounted in the swing body 1 of each of the single variable valve apparatuses is mounted so as to keep a state of being in contact with a cam which implements a zero lift.

The cam which implements the zero lift may mean a cam which substantially has only a base circle shape. Therefore, even when the cam which implements the zero lift makes one revolution, there is no change in lift, such that the swing body 1 does not actually rotate and thus the valve is not opened and closed.

Further, swing arms 61 driven according to only one cam profile as in the related art are mounted at intake sides and exhaust sides of the rest combustion chambers with no single variable valve apparatus, and the swing arms 61 are each driven by a cam having the base cam profile.

The engine configured as described above may be operated in operation modes as in FIG. 18, and a switching between a cylinder deactivation (CDA) operation mode (hereinafter, referred to as a CDA mode) and a mode (hereinafter, referred to as a base mode) in which operation is performed according to the base cam profile is possible.

That is, in a case of implementing the CDA mode, the first motor 55 and the second motor 59 are driven to prevent the inner bodies from being latched by the latching pins of the single variable valve apparatuses, such that valves of Cylinder numbers 2 and 3 are not substantially operated to implement a CDA function and only valves of Cylinder numbers 1 and 4 are opened and closed to operate the engine.

Meanwhile, in a case of implementing the base mode, the first motor 55 and the second motor 59 are driven to operate the swing bodies 1 of the single variable valve apparatuses according to the base lift to open and close the valve, such that the engine is operated in the base mode which is a general operation state.

Figure 20:
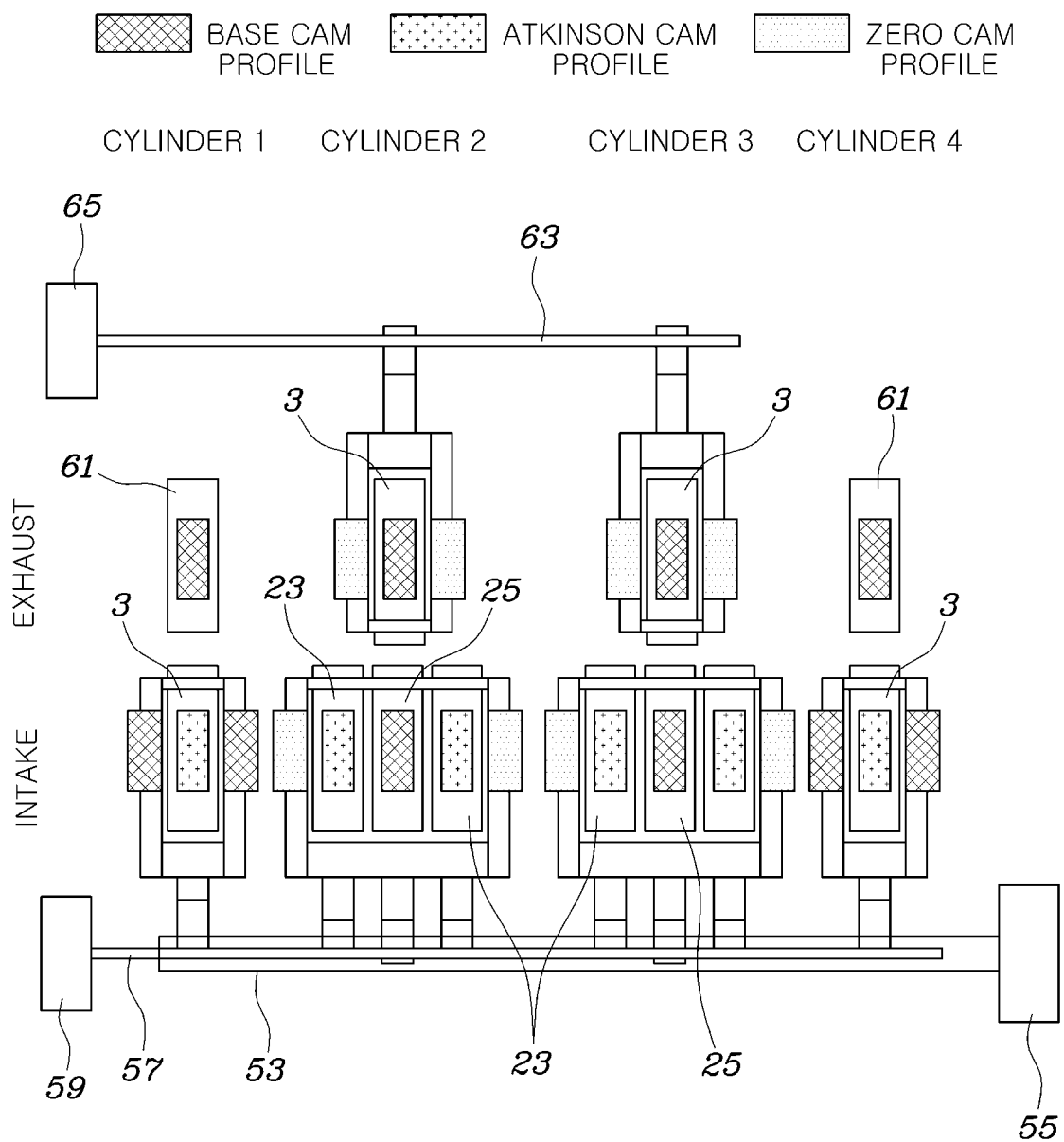
FIG. 20 is a diagram describing a variable valve engine according to a third embodiment of the present disclosure.
Figure 21:
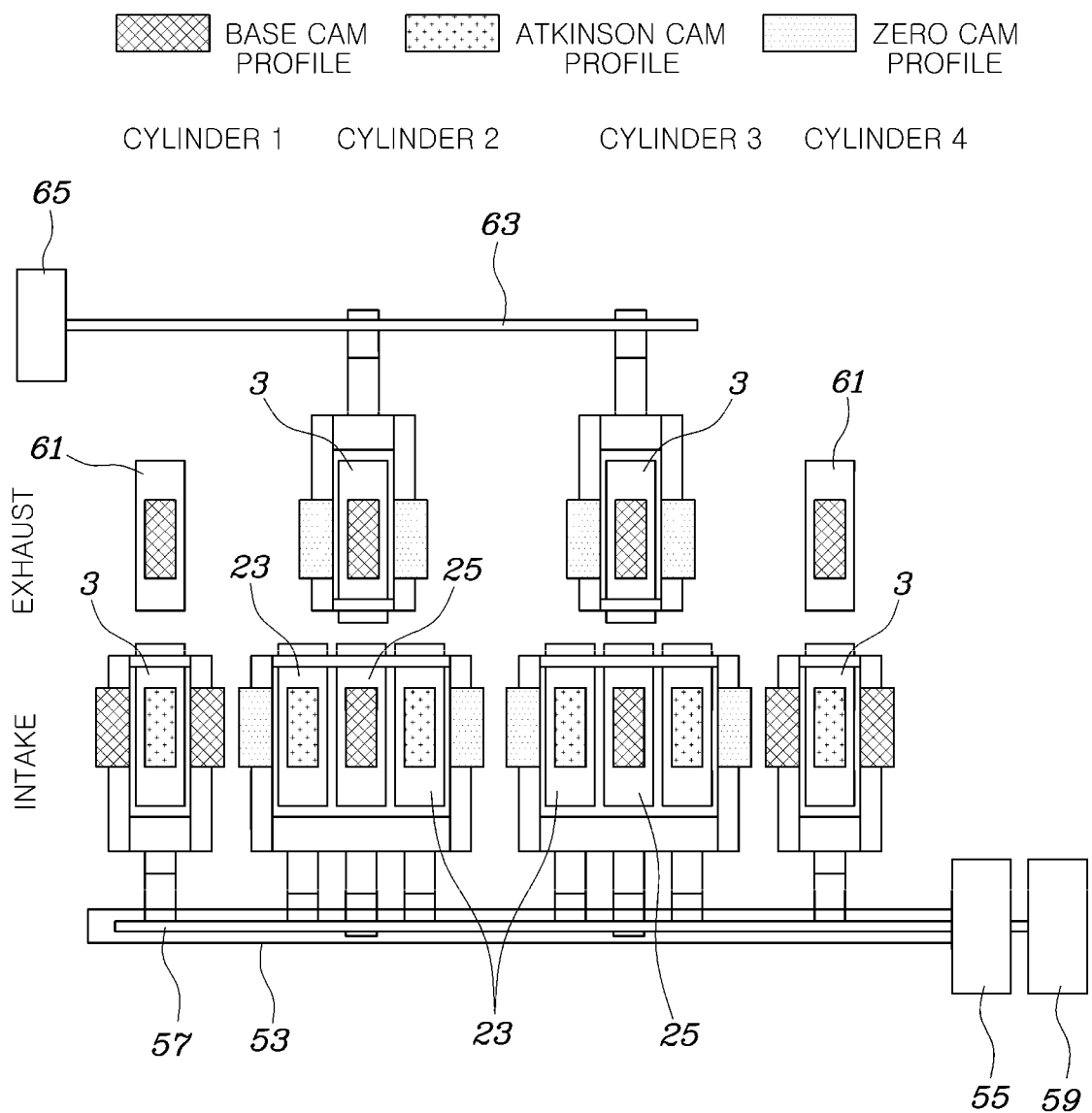
FIG. 21 is a diagram describing a variable valve engine according to a fourth embodiment of the present disclosure.

Variable valve engines according to second to fourth embodiments of the present disclosure illustrated in FIGS. 19 to 21 may each include multi variable valve apparatuses each including a plurality of inner bodies and mounted, respectively, at intake sides of combustion chambers which correspond to the half of entire combustion chambers of the engine and have an unconsecutive combustion sequence; single variable valve apparatuses each including one inner body and mounted, respectively, at exhaust sides of the combustion chambers where the multi variable valve apparatuses are mounted, and intake sides of the remaining combustion chambers; the first control shaft 53 mounted to switch a state of pressing first latching pins 27 of the multi variable valve apparatuses mounted at the intake sides, respectively; the first motor 55 mounted to drive the first control shaft 53; the second control shaft 57 mounted to switch a state of pressing latching pins of the single variable valve apparatuses mounted at the intake sides, respectively, and second latching pins 29 of the multi variable valve apparatuses; the second motor 59 mounted to drive the second control shaft 57; a third control shaft 63 mounted to switch a state of pressing latching pins of the single variable valve apparatuses mounted at the exhaust sides, respectively; and a third motor 65 mounted to drive the third control shaft 63.

Here, the combustion chambers which correspond to the half of entire combustion chambers of the engine and have an unconsecutive combustion sequence mean combustion chambers of Cylinder number 2 and Cylinder number 3 at the center among Cylinder numbers 1 to 4 sequentially arranged in the engine of FIG. 19, because a combustion sequence in an engine with four combustion chambers (cylinder numbers 1, 2, 3, 4) is generally 1-3-4-2.

This is to arrange a deactivated combustion chamber between combustion chambers where combustion is performed, rather than consecutively arranging deactivated combustion chambers, when implementing the CDA.

Therefore, the multi variable valve apparatuses are mounted only at the intake sides of Cylinder numbers 2 and 3, the single variable valve apparatuses are mounted at the exhaust sides of Cylinder numbers 2 and 3, and the intake sides of Cylinder numbers 1 and 4, and swing arms 61 are mounted at exhaust sides of Cylinder numbers 1 and 4.

The inner roller 11 mounted in the first inner body 23 of each of the multi variable valve apparatuses is mounted so as to keep a state of being in contact with a cam having the base cam profile; the inner roller 11 mounted in the second inner body 25 of each of the multi variable valve apparatuses is mounted so as to keep a state of being in contact with a cam having the Atkinson cam profile; the swing roller 15 mounted in the swing body 1 of each of the multi variable valve apparatuses is mounted so as to keep a state of being in contact with a cam which implements the zero lift; the inner roller 11 mounted in the inner body of each of the single variable valve apparatuses mounted at the intake sides of the combustion chambers is mounted so as to keep a state of being in contact with a cam having the Atkinson cam profile; the swing roller 15 mounted in the swing body 1 of each of the single variable valve apparatuses mounted at the intake sides of the combustion chambers is mounted so as to keep a state of being in contact with a cam having the base cam profile; the inner roller 11 mounted in the inner body of each of the single variable valve apparatuses mounted at the exhaust sides of the combustion chambers is mounted so as to keep a state of being in contact with a cam having the base cam profile; and the swing roller 15 mounted in the swing body 1 of each of the single variable valve apparatuses mounted at the exhaust sides of the combustion chambers is mounted so as to keep a state of being in contact with a cam which implements the zero lift.

Meanwhile, the general swing arms 61 are mounted at the exhaust sides of Cylinder numbers 1 and 4 which are not mentioned to open and close the valve according to the base cam profile.

The above-described configuration is common to all the second to fourth embodiments of FIGS. 19 to 21.

In the second embodiment of FIG. 19, the first control shaft 53 and the second control shaft 57 are disposed adjacent to the intake sides of the combustion chambers in parallel while being spaced apart from each other, and the first motor 55 and the second motor 59 are mounted opposite to each other with the first control shaft 53 and the second control shaft 57 interposed therebetween.

Meanwhile, in the third embodiment of FIG. 20, the first control shaft 53 and the second control shaft 57 are coaxially disposed adjacent to the intake sides of the combustion chambers, and the first motor 55 and the second motor 59 are mounted opposite to each other with the first control shaft 53 and the second control shaft 57 interposed therebetween.

In the fourth embodiment of FIG. 21, the first control shaft 53 and the second control shaft 57 are coaxially disposed adjacent to the intake sides of the combustion chambers, and the first motor 55 and the second motor 59 are mounted at one sides of the first control shaft 53 and the second control shaft 57, respectively.

Here, in all of the second to fourth embodiments, the third control shaft 63 mounted adjacent to the exhaust side of the engine is driven by the third motor 65 to control the single variable valve apparatuses.

Differences in disposition of the first control shaft 53, the second control shaft 57, the first motor 55, and the second motor 59 among the variable valve engines according to the second to fourth embodiments enable to use an optimized embodiment in consideration of a specific shape of the engine and relation with ambient components, thereby making it possible to avoid a limitation in space and implement a compact engine.

All the variable valve engines according to the second to fourth embodiments may be operated in operation modes as in FIG. 22. In a method for controlling the variable valve engine, an engine operation region may be partitioned according to engine RPM and a desired engine torque, and the engine operation region may be classified into a CDA with Atkinson operation region, a CDA with base operation region, an Atkinson operation region, a base with Atkinson operation region, and a base operation region in ascending order of magnitude of a load to the engine in a specific engine RPM range.

In the CDA with Atkinson operation region, all of the multi variable valve apparatuses at the intake sides of the combustion chambers and the single variable valve apparatuses at the exhaust sides of the combustion chambers are controlled to implement the zero lift, and the single variable valve apparatuses at the intake sides of the combustion chambers are controlled to be driven according to the Atkinson cam profile.

In the CDA with base operation region, all of the multi variable valve apparatuses at the intake sides of the combustion chambers and the single variable valve apparatuses at the exhaust sides of the combustion chambers are controlled to implement the zero lift, and the single variable valve apparatuses at the intake sides of the combustion chambers are controlled to be driven according to the base cam profile.

In the Atkinson operation region, all of the multi variable valve apparatuses at the intake sides of the combustion chambers and the single variable valve apparatuses at the intake sides of the combustion chambers are controlled to be driven according to the Atkinson cam profile, and the single variable valve apparatuses at the exhaust sides of the combustion chambers are controlled to be driven according to the base cam profile.

In the base with Atkinson operation region, all of the multi variable valve apparatuses at the intake sides of the combustion chambers are controlled to be driven according to the Atkinson cam profile, and the single variable valve apparatuses at the intake sides of the combustion chambers and the single variable valve apparatuses at the exhaust sides of the combustion chambers are controlled to be driven according to the base cam profile.

In the base operation region, all of the multi variable valve apparatuses and the single variable valve apparatuses are controlled to be driven according to the base cam profile.

That is, a controller calculates a desired engine torque, which is a load to the engine, on the basis of, for example, an accelerator pedal operation state of a driver and determines current engine RPM to determine to which operation region among engine operation regions as in FIG. 23 the engine currently belongs, and then performs a control by classifying the determined operation region into one of the CDA with Atkinson operation region, the CDA with base operation region, the Atkinson operation region, the base with Atkinson operation region, and the base operation region.

According to the present disclosure, the cam profile for opening and closing the valve of the combustion chamber of the engine, may be easily changed with a relatively simple configuration and the CDA function may be implemented, thereby making it possible to reduce fuel consumption of the engine and improve marketability.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A variable valve apparatus comprising:
a swing body mounted to rotate to open and close a valve;
an inner body driven by a cam and mounted in the swing body so as to switch between a relatively-rotatable state and a latched state with respect to the swing body;
a latching pin slidably mounted in the swing body so as to switch between the latched state and the relatively-rotatable state of the inner body with respect to the swing body; and
a control mechanism pressing the latching pin to make the inner body be latched to the swing body,
wherein:
a plurality of inner bodies are coaxially arranged in a row in the swing body,
a plurality of latching pins are mounted in the swing body so as to switch latched states of the plurality of inner bodies with respect to the swing body, respectively, and
the control mechanism includes:
first and second control shafts coaxially arranged to each other, and
a plurality of control levers mounted on at least one of a first control shaft or a second control shaft, so that a rotational force of at least one of the first or second control shafts is converted into an elastic force applying to end portions of the plurality of latching pins protruding outward from the swing body.

2. The variable valve apparatus of claim 1, wherein a lower portion of a first side of the swing body is spherically supported by a supporting member, and a lower portion of a second side of the swing body is in contact with a stem end of the valve, such that the swing body rotates with respect to the supporting member to open and close the valve.

3. The variable valve apparatus of claim 1, wherein the inner body is mounted rotatably with respect to the swing body around a rotation axis parallel to a rotation axis of the swing body, and
an inner roller is rotatably mounted while keeping a state of being in contact with the cam to receive movement of the cam.

4. The variable valve apparatus of claim 3, wherein an inner spring is mounted between the inner body and the swing body to elastically support the inner roller of the inner body toward the cam, and
a swing roller is mounted in the swing body so as to be rotatable around a rotation axis parallel to a rotation axis of the inner roller.

5. The variable valve apparatus of claim 4, wherein the latching pin is inserted into an inner groove portion to constrain rotation of the inner body with respect to the swing body, the inner groove portion formed in the inner body,
wherein the latching pin slidably penetrates a swing hole formed in the swing body, and
wherein a latching spring elastically supports the latching pin in a direction away from the inner groove portion so that the latching pin protrudes outward from the swing body, the latching spring provided between the latching pin and the swing body.

6. The variable valve apparatus of claim 1, wherein the cam includes a first cam and a second cam which are mounted on a same cam shaft and have cam profiles different from each other,
first inner bodies among the plurality of inner bodies are installed to be each driven by the first cam,
a second inner body among the plurality of inner bodies is mounted to be driven by the second cam, and
the latching pins include first latching pins mounted to make the first inner bodies be latched to the swing body, and a second latching pin mounted to make the second inner body be latched to the swing body.

7. The variable valve apparatus of claim 6, wherein the second inner body is mounted at a center of the swing body,
the first inner bodies are mounted at opposite sides of the second inner body, respectively, and
inner rollers of the first inner bodies each have a width smaller than a width of an inner roller of the second inner body.

8. The variable valve apparatus of claim 6, wherein the first control shaft is a hollow shaft, and the second control shaft is inserted into the hollow shaft,
wherein the plurality of control levers include:
a first control lever connected to the first control shaft and configured to transfer an elastic force to the first latching pin, and
a second control lever connected to the second control shaft and configured to transfer an elastic force to the second latching pin, and
wherein a cut portion is formed in the first control shaft and configured to allow a rotational force of the second control shaft to be transferred to the second control lever positioned outside the first control shaft.

9. The variable valve apparatus of claim 8, further comprising: a first connecting pin configured to limit a rotation range of the first control lever and fixed to the first control shaft;
- a first control spring mounted between the first connecting pin and the first control lever;
- a second connecting pin fixed to the second control shaft while penetrating through the cut portion so as to limit a rotation range of the second control lever; and
- a second control spring mounted between the second connecting pin and the second control lever,
- wherein the first control lever is rotatably mounted on an outer circumferential surface of the first control shaft, and the second control lever is rotatably mounted on the outer circumferential surface of the hollow shaft in a rotatable state with respect to the second control shaft.

10. The variable valve apparatus of claim 8, wherein the first control lever has an elastically-deformable plate shape, and is fixed to an outer circumferential surface of the first control shaft by a first fixing pin, and
- wherein the second control lever has an elastically-deformable plate shape and is fixed to the second control shaft by a second fixing pin through the cut portion at the outside of the first control shaft.

11. A variable valve engine comprising:
- single variable valve apparatuses each including one inner body and mounted, respectively, at intake sides and exhaust sides of combustion chambers which correspond to the half of entire combustion chambers of the engine and have unconsecutive combustion sequences;
- a first control shaft mounted to switch a state of pressing latching pins of the single variable valve apparatuses mounted at the intake sides, respectively;
- a first motor mounted to drive the first control shaft;
- a second control shaft configured to change a state of pressing latching pins of the single variable valve apparatuses mounted at the exhaust sides; and
- a second motor configured to drive the second control shaft wherein the first and second control shafts are coaxially arranged to each other, and a plurality of control levers are mounted on at least one of the first control shaft or the second control shaft, so that a rotational force of at least one of the first or second control shafts is converted into an elastic force applying to end portions of the latching pins of the single variable valve apparatus.

12. The variable valve engine of claim 11, wherein an inner roller mounted in the inner body of each of the single variable valve apparatuses is mounted so as to keep a state of being in contact with a cam having a base cam profile, and
- a swing roller mounted in a swing body of each of the single variable valve apparatuses is mounted so as to keep a state of being in contact with a cam which implements a zero lift.

13. A variable valve engine comprising:
- multi variable valve apparatuses each including a plurality of inner bodies and mounted, respectively, at intake sides of combustion chambers which correspond to the half of entire combustion chambers of the engine and have unconsecutive combustion sequences;
- single variable valve apparatuses each including one inner body and mounted, respectively, at exhaust sides of the combustion chambers where the multi variable valve apparatuses are mounted, and intake sides of remaining combustion chambers;
- a first control shaft mounted to change a state of pressing first latching pins of the multi variable valve apparatuses mounted at the intake sides, respectively;
- a first motor mounted to drive the first control shaft;
- a second control shaft mounted to change a state of pressing latching pins of the single variable valve apparatuses mounted at the intake sides, respectively, and second latching pins of the multi variable valve apparatuses;
- a second motor mounted to drive the second control shaft;
- a third control shaft mounted to change a state of pressing latching pins of the single variable valve apparatuses mounted at the exhaust sides, respectively; and
- a third motor mounted to drive the third control shaft.

14. The variable valve engine of claim 13, wherein an inner roller mounted in a first inner body of each of the multi variable valve apparatuses is mounted so as to keep a state of being in contact with a cam having a base cam profile;
- an inner roller mounted in a second inner body of each of the multi variable valve apparatuses is mounted so as to keep a state of being in contact with a cam having an Atkinson cam profile;
- a swing roller mounted in a swing body of each of the multi variable valve apparatuses is mounted so as to keep a state of being in contact with a cam which implements a zero lift;
- an inner roller mounted in an inner body of each of the single variable valve apparatuses mounted at the intake sides of the combustion chambers is mounted so as to keep a state of being in contact with a cam having the Atkinson cam profile;
- a swing roller mounted in a swing body of each of the single variable valve apparatuses mounted at the intake sides of the combustion chambers is mounted so as to keep a state of being in contact with a cam having the base cam profile;
- an inner roller mounted in an inner body of each of the single variable valve apparatuses mounted at the exhaust sides of the combustion chambers is mounted so as to keep a state of being in contact with a cam having the base cam profile; and
- a swing roller mounted in a swing body of each of the single variable valve apparatuses mounted at the exhaust sides of the combustion chambers is mounted so as to keep a state of being in contact with a cam which implements the zero lift.

15. The variable valve engine of claim 14, wherein the first control shaft and the second control shaft are disposed adjacent to the intake sides of the combustion chambers in parallel while being spaced apart from each other, and
- the first motor and the second motor are mounted opposite to each other with the first control shaft and the second control shaft interposed therebetween.

16. The variable valve engine of claim 14, wherein the first control shaft and the second control shaft are coaxially disposed adjacent to the intake sides of the combustion chambers, and
- the first motor and the second motor are mounted opposite to each other with the first control shaft and the second control shaft interposed therebetween.

17. The variable valve engine of claim 14, wherein the first control shaft and the second control shaft are coaxially disposed adjacent to the intake sides of the combustion chambers, and
- the first motor and the second motor are mounted at one sides of the first control shaft and the second control shaft, respectively.

18. A method for controlling a variable valve engine, the method comprising:
- partitioning an engine operation region according to engine revolutions per minute (RPM) and a desired engine torque and classifying the engine operation region into a cylinder deactivation (CDA) with Atkinson operation region, a CDA with base operation region, an Atkinson operation region, a base with Atkinson operation region, and a base operation region in ascending order of magnitude of a load to the engine in a specific engine RPM range;
- controlling all of multi variable valve apparatuses at intake sides of combustion chambers and single variable valve apparatuses at exhaust sides of the combustion chambers to implement the zero lift, and controlling the single variable valve apparatuses at the intake sides of the combustion chambers to be driven according to an Atkinson cam profile in the CDA with Atkinson operation region;
- controlling all of the multi variable valve apparatuses at the intake sides of the combustion chambers and the single variable valve apparatuses at the exhaust sides of the combustion chambers to implement the zero lift, and controlling the single variable valve apparatuses at the intake sides of the combustion chambers to be driven according to a base cam profile in the CDA with the base operation region;
- controlling all of the multi variable valve apparatuses at the intake sides of the combustion chambers and the single variable valve apparatuses at the intake sides of the combustion chambers to be driven according to the Atkinson cam profile, and controlling the single variable valve apparatuses at the exhaust sides of the combustion chambers to be driven according to the base cam profile in the Atkinson operation region;
- controlling all of the multi variable valve apparatuses at the intake sides of the combustion chambers to be driven according to the Atkinson cam profile, and controlling the single variable valve apparatuses at the intake sides of the combustion chambers and the single variable valve apparatuses at the exhaust sides of the combustion chambers to be driven according to the base cam profile in the base with Atkinson operation region; and
- controlling all of the multi variable valve apparatuses and the single variable valve apparatuses to be driven according to the base cam profile in the base operation region.

* * * * *